United States Patent [19]
Sako et al.

[11] Patent Number: 5,771,159
[45] Date of Patent: Jun. 23, 1998

[54] POWER SUPPLY DEVICE

[75] Inventors: Hiroyuki Sako; Koji Nishiura; Masahiro Yamanaka, all of Kadoma, Japan

[73] Assignee: Matsushita Electric Woks, Ltd., Osaka, Japan

[21] Appl. No.: 891,060

[22] Filed: Jul. 10, 1997

Related U.S. Application Data

[63] Continuation of Ser. No. 396,433, Feb. 28, 1995, abandoned.

[30] Foreign Application Priority Data

| Nov. 25, 1994 | [JP] | Japan | 6-291751 |
| Nov. 25, 1994 | [JP] | Japan | 6-291753 |
| Nov. 25, 1994 | [JP] | Japan | 6-291754 |
| Nov. 25, 1994 | [JP] | Japan | 6-291777 |
| Nov. 25, 1994 | [JP] | Japan | 6-291853 |

[51] Int. Cl.$^6$ .................................................. H02M 5/44
[52] U.S. Cl. .................... 363/17; 363/37; 363/98
[58] Field of Search ..................... 363/97, 131, 17, 363/37, 98, 132

[56] References Cited

U.S. PATENT DOCUMENTS

| 5,381,327 | 1/1995 | Yan | 363/24 |
| 5,410,466 | 4/1995 | Maehara | 363/98 |
| 5,459,651 | 10/1995 | Maehara | 363/34 |
| 5,517,403 | 5/1996 | Maehara | 363/132 |
| 5,541,829 | 7/1996 | Maehara et al. | 363/34 |
| 5,644,480 | 7/1997 | Sako et al. | 363/17 |
| 5,657,220 | 8/1997 | Yan | 363/132 |

*Primary Examiner*—Peter S. Wong
*Assistant Examiner*—Derek J. Jardieu

[57] ABSTRACT

A power supply device in which an inverter circuit is supplied with power directly from a rectification circuit, the inverter circuit has a pair of switching elements connected in series with each other and connected between both ends of the rectification circuit through an impedance element, a series circuit of the impedance element, two capacitors and an inductor is connected in parallel to one of the switching elements of the inverter circuit connected to positive polarity one of the both ends of the rectification circuit, a load is connected across one of the capacitor, a valley filling circuit receives an output of the inverter circuit through a diode provided in the valley filling circuit and supplies it to a power supply capacitor provided therein and, when a DC output voltage of the rectification circuit drops, the valley filling circuit supplies power to the inverter circuit via the power supply capacitor and another diode provided therein. Thereby, fluctuations in a current supplied to the load can be effectively reduced.

9 Claims, 22 Drawing Sheets

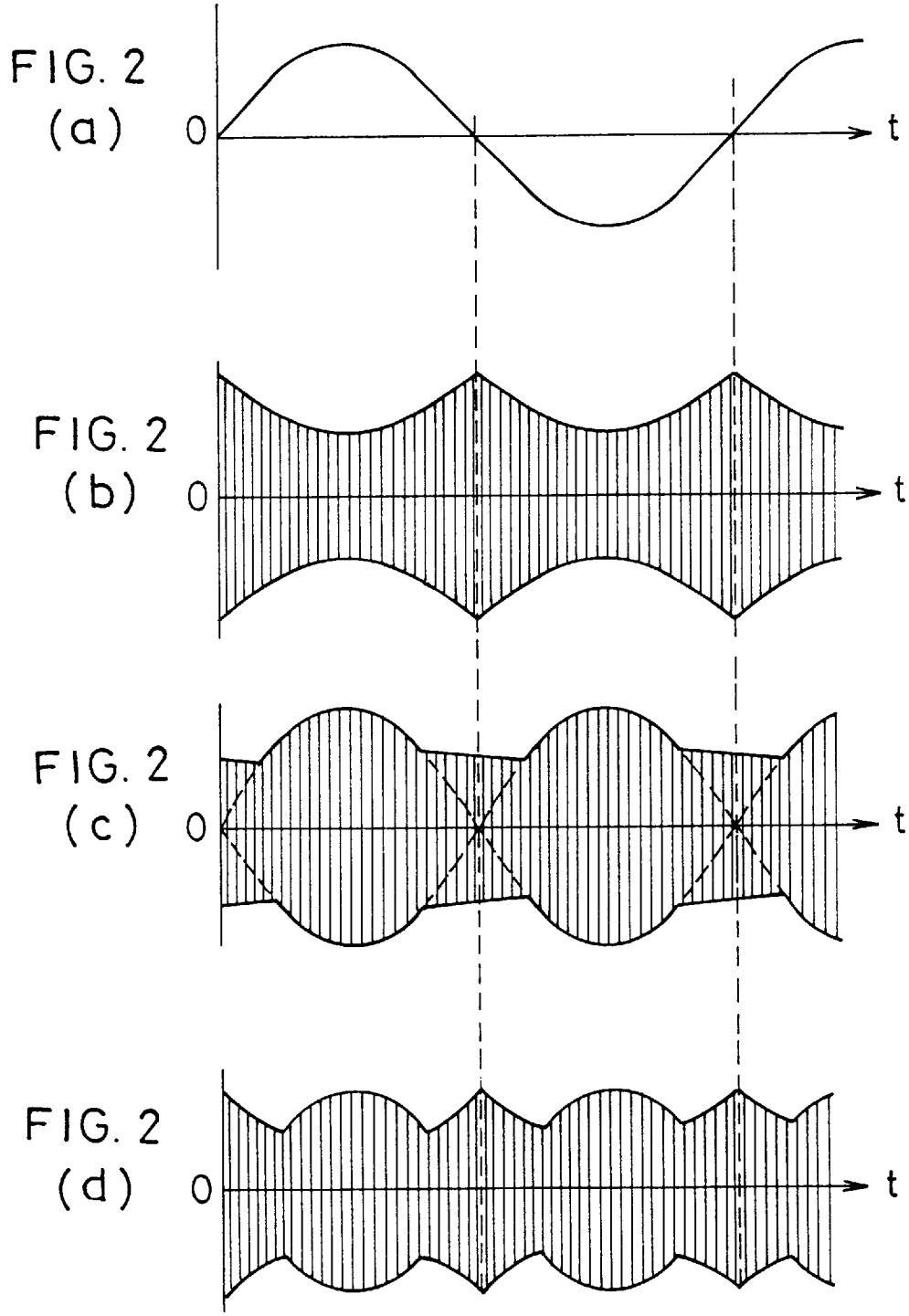

POWER SUPPLY DEVICE

This disclosure is a continuation of patent application Ser. No. 08/396,433, filed Feb. 28, 1995, now abandoned.

BACKGROUND OF THE INVENTION

The present invention relates to a power supply device which reduces fluctuations in a current supplied to a load.

DESCRIPTION OF RELATED ART

There has been conventionally known a power supply device which uses an inverter circuit wherein switching elements are turned ON and OFF to convert a DC power obtained through rectification and smoothing of power of an AC power source into an AC output.

Further, a power supply for the inverter circuit, which requires a stable DC power, is arranged so that, in the simplest form, a capacitor is used for smoothing the DC power obtained through the rectification of the AC power. However, this arrangement has a problem that the power supply device is reduced in power factor. For improving the power factor, there is known an arrangement that a power supply part comprises a DC/DC converter circuit. Further, for the purpose of simplifying a circuit based on the above arrangement, there is proposed such a circuit arrangement that switching elements of a DC/DC converter is used also as those of an inverter circuit, as disclosed in U.S. Pat. No. 4,564,897. However, this circuit arrangement is advantageous in that the switching elements are commonly used to realize a simplified circuit, but is disadvantageous in that the presence of two of the inverter circuit and DC/DC converter circuit provides a complex circuit arrangement, which leads to an increased cost. To avoid such disadvantage, there is also suggested such a circuit arrangement that an inverter circuit per se removes distortion in an input current while eliminating the need for using such a circuit as a DC/DC converter.

For example, Japanese Patent Application Laid-Open Publication No. 5-38161 discloses a circuit arrangement in which an inverter circuit comprises a pair of switching elements as MOD type field effect transistors (MOS FETs), a power of an AC power source is subjected by a rectification circuit such as a diode bridge to a rectifying operation, the switching elements of the inverter circuit are alternately turned ON and OFF at a high frequency to convert an output of the rectification circuit to an AC output, the AC output is supplied to a load, and the operation of the inverter circuit enables improvement of distortion in an input current. In the publication, a smoothing capacitor is disposed at the opposite side of the inverter circuit to the rectification circuit. In the inverter circuit, in more detail, a series circuit of a DC-component blocking capacitor and the above both switching elements is connected between DC output ends of the rectification circuit RE, a series circuit of a resonance circuit of two capacitors and an inductor and one of the switching elements connected to negative polarity one of the DC output ends of the rectification circuit is connected between the DC output ends of the rectification circuit, a diode is connected across one of the capacitors, and a load is connected across the other of the capacitors. The smoothing capacitor is connected across the series circuit of the both switching elements and the both switching elements are alternately turned ON and OFF at a high frequency by a control circuit. Provided between the AC power source AC and rectification circuit is a filter FL to suppress external noise leakage.

With the aforementioned circuit arrangement, since power is always supplied from the AC power source to the inverter circuit, there takes place no pause period in the input current from the AC power source and the distortion of the input current is suppressed when compared with the arrangement having the inverter circuit provided at the rear stage of the smoothing capacitor.

Meanwhile, explanation will be made as to the operation of the above circuit arrangement in connection with valley and mountain parts of the DC output voltage of the rectification circuit. Since a voltage across one capacitor C1 is high and the capacitor effectively functions, a resonance circuit is established. In this case, it is assumed that the power is obtained as a voltage across the smoothing capacitor and other capacitor. Assuming the DC-component blocking capacitor is denoted by C1, one capacitor is by C2, and an inductor is by L1, then a resonance frequency fd is expressed as follows.

$$fd = \tfrac{1}{2}\pi \{L1C1C2/(C1+C2)\}^{1/2}$$

Since the voltage across the DC-component blocking capacitor C1 can be practically neglected at the mountain parts, an effective resonance circuit is established, at which time a resonance frequency fc is written as follows.

$$fc = \tfrac{1}{2}\pi (L1C2)^{1/2}$$

That is, it will be appreciated that, in the above circuit arrangement, the resonance frequency varies in a range of the above resonance frequencies fd and fc according to the fluctuations of the DC output voltage of the rectification circuit. Since a series circuit of the capacitors C1 and C2 forms part of a series resonance circuit at valley parts, the capacitor C1 is smaller in capacitance than the capacitor C2 which forms part of the series resonance circuit at mountain parts and a relationship fd > fc is satisfied. In this case, since the switching frequency of the switching elements Q1 and Q2 is set at a constant value higher than the resonance frequencies fc and fd so that the valley parts become close to the switching frequency, whereby the current supplied to the load at the valley parts becomes larger than that at the mountain parts. In other words, the current supplied to the load varies large at the valley parts and small at the mountain parts according to the fluctuations of the DC output voltage of the rectification circuit.

As will be clear from the foregoing explanation, with the aforementioned circuit configuration, the distortion of the input current can be improved, but the supply current to the load fluctuates and thus use of a discharge lamp as the load for example causes variations of its light output, resulting in flickering of the lamp. In order to avoid this, it is considered to change the switching frequency of the switching elements according to variations in the DC output voltage of the rectification circuit to keep the supply current to the load substantially constant, but this disadvantageously involves a complicated circuit arrangement with a high cost.

The same types of circuit arrangements as mentioned above are disclosed in U.S. Pat. Nos. 5,274,540, 5,251,119, 4,511,823, 5,134,344, etc. In any of the above patents, an inverter circuit supplies a high frequency output to a load and has a function of improving the distortion of an input current, but the above problems have still remained therein.

Meanwhile, a power supply circuit is also suggested as disclosed in Japanese Patent Application Laid-Open Publication No. 59-220081. In the power supply circuit, in place of a smoothing capacitor connected between the DC output ends of a rectification circuit, a valley filling circuit is provided for superimposing part of a high frequency voltage of an inverter circuit on the DC output voltage of the rectification circuit. In the inverter circuit used in this power supply circuit, which may be one of various types of inverter circuits, a series circuit of a pair of switching elements as bipolar transistors, a series circuit of a pair of capacitors and a series circuit of a pair of diodes are connected across both ends of a valley filling circuit, a junction point between the pair of capacitors and a junction point between the pair of diodes are commonly connected, a series resonance circuit of an inductor and a capacitor is inserted between the above common junction point and the junction point of the switching elements, and a load is wired across the capacitor. Further, the series circuit of the switching elements and the series circuit of the diodes are connected in an inverse parallel relationship thereto. That is, a half bridge type inverter circuit is established. The both switching elements are alternately turned ON and OFF at a high frequency by a control circuit.

The above valley filling circuit includes a diode connected at its cathode to positive polarity one of the DC output ends of the rectification circuit, an inductor and a valley filling capacitor connected in series with the anode of the diode, and a diode connected at its cathode to the series circuit of the inductor and valley filling capacitor and also to a junction point between the series circuit and diode and also connected at its anode to the junction point of the switching elements. With such an arrangement, a high frequency voltage appearing at the junction point of the both switching elements is rectified by the diodes and the valley filling capacitor is previously charged through the inductor in the vicinity of peak values (called mountain parts) of the DC output voltage of the rectification circuit; whereas the charge accumulated in the valley filling capacitor is discharged through the diode in the vicinity of OV (called valley parts) of the DC output voltage of the rectification circuit, thereby realizing power supply to the inverter circuit.

In this case, the supply voltage to the load fluctuates at intervals of half cycle of the voltage of the AC power source, and power supply is carried out from the valley filling circuit to the inverter circuit at the valley parts of the DC output voltage of the rectification circuit, which means that there is some pause period in the input current from the AC power source.

In order to avoiding the generation of a pause period in the input current from the AC power source, there is suggested such an improved circuit as disclosed in Japanese Patent Application Laid-Open Publication No. 5-56659. This prior art fails to disclose a combination of the valley-filling power supply section and an inverter circuit section, and has the same problem as the aforementioned Japanese Patent Application Laid-Open Publication No. 5-38161, that, since the different parts of the waveform of the load current contribute differently to the resonance at the mountain and valley parts of the voltage of the AC power source, the load current waveform largely fluctuates at the mountain and valley parts of the AC power source.

Thus the circuit arrangements of the above Japanese Patent Application Laid-Open Publication Nos. 5-38161 and 5-56659, etc. also have a problem that, as the input current waveform is made to approach a waveform similar to the waveform of the input voltage to improve its force factor, the current supplied to the load fluctuates more largely. Another problem is that the use of the smoothing capacitor causes generation of a rush current because the smoothing capacitor is charged at the time of turning ON the power. With the above circuit configuration, the capacitance of the capacitor can be made small and the switching elements and inductor are provided between the DC-component blocking capacitor and the rectification circuit, so that substantially no rush current occurs but removal of the pause period in the input current lead disadvantageously to large fluctuations of the supply current to the load. Further, the circuit arrangement disclosed in Japanese Patent Application Laid-Open Publication No. 5-56659, which fails to disclose provision of a valley filling circuit, presents a problem similar to that already explained in connection with Japanese Patent Application LaidOpen Publication No. 5-38161.

Meanwhile, the control of the switching frequency of the switching elements enables suppression of fluctuations of the current supplied to the load but this also disadvantageously involves the complex arrangement of the control circuit, leading to an increased cost. Another problem is that the fluctuations in the switching frequency lead to the fact that it becomes difficult to design a filter circuit for noise prevention, resulting in external noise leakage.

SUMMARY OF THE INVENTION

In view of the above circumstances, it is accordingly an object of the present invention to provide a power supply device which can suppress fluctuations in a current supplied to a load and can avoid generation of a pause period in an input current to thereby improve distortion in the input current.

In accordance with an aspect of the present invention, the above object is attained by providing a power supply device for rectifying an AC voltage of an AC power source by a rectifying means, converting a rectified voltage to a high frequency output by an inverter means connected to output ends of the rectifying means and then supplying the high frequency output to a load, wherein the inverter means converts the rectified voltage to the high frequency output and supplies the high frequency output to the load so that the high frequency output varies in different directions from the output of the rectifying means, the inverter means being provided to receive an AC input current nearly similar in waveform to the AC power source voltage, an auxiliary DC power source which output varies in the same direction as the output of the rectifying means is connected to the output ends of the rectifying means, and a content of AC power source components contained in the high frequency output of the inverter means is smaller than that of AC power source components contained in the output of the rectifying means.

BRIEF DESCRIPTION OF THE DRAWINGS

Other objects and advantages of the present invention will become apparent from the following detailed description of preferred embodiment(s) thereof in connection with the accompanying drawings, in which:

FIGS. 2a to 2d show waveforms of signals appearing at points in the embodiment of FIG. 1;

DETAILED DESCRIPTION OF THE PREFERRED EMBODIMENTS (Embodiment 1)

Figure 1:
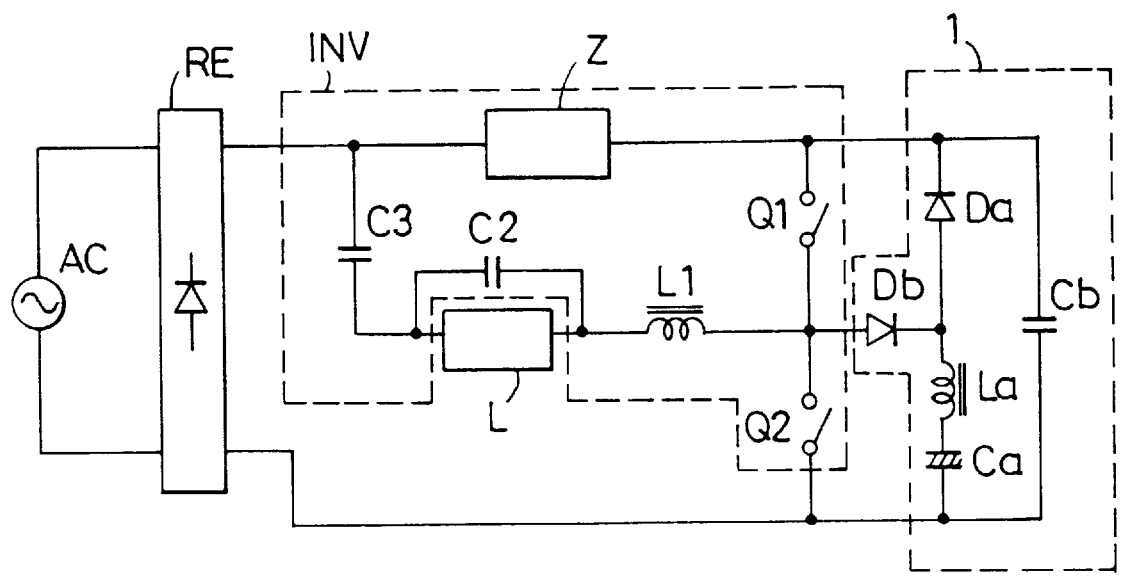
FIG. 1 is a schematic circuit diagram of a power supply device in accordance with a first embodiment of the present invention.

The present embodiment is arranged so that, as shown in FIG. 1, power of an AC power source AC is subjected to a full-wave rectification by such a rectification circuit RE as a diode bridge, a DC output voltage of the rectification circuit RE is converted by an inverter circuit INV into a high frequency AC output which is supplied to a load L. More in detail, a valley filling circuit 1 is provided as an auxiliary DC power source means at the latter stage of the inverter circuit INV. That is, the smoothing capacitor used in the prior art circuit configuration is replaced by the valley filling circuit 1, and the DC cut-off capacitor and diode is replaced by a suitable impedance element Z (any of a capacitor, inductor and resistor, or a combination thereof).

In the inverter circuit INV, more specifically, a series circuit of a pair of switching elements Q1 and Q2 is connected between DC output terminals of the rectification circuit RE through the impedance element Z, a series resonance circuit of capacitors C2 and C3 and an inductor L1 is connected also between the DC output terminals of the rectification circuit RE, the capacitor C2 being connected in parallel to the load L. In the valley filling circuit 1, a valley filling capacitor (which will be referred merely as the capacitor, hereinafter) Ca is connected in series with an anode of a diode Da via an inductor La, a series circuit of the diode Da, inductor La and capacitor Ca is connected across another capacitor Cb, another diode Db being connected at its cathode side to a junction point between the diode Da and inductor La.

The series circuit of the diode Da, inductor La and capacitor Ca is connected across the series circuit of the switching elements Q1 and Q2 of the inverter circuit INV, and the diode Db is connected at its anode side to a junction point between the switching elements Q1 and Q2 of the inverter circuit INV.

The capacitor Ca, which comprises an electrolytic capacitor, has a capacitance sufficiently larger than that of the capacitor Cb. Although the switching elements Q1 and Q2 are supposed to comprises respectively a MOS type field effect transistor (MOS FET), the switching elements may a bipolar transistor with a diode connected in inverse parallel thereto, or the like.

The both switching elements Q1 and Q2 are alternately turned ON and OFF at a high frequency under control of a suitable control circuit (not shown). Accordingly, when the switching element Q2 is in its ON state, a resonance current flows from the rectification circuit RE or valley filling circuit 1 through a capacitor C3, load Z, capacitor C2, inductor L1 and switching element Q2; whereas, when the switching element Q1 is in its ON state, the charge accumulated in the capacitor C3 is discharged so that a resonance current flows through the switching element Q1, inductor L1, load Z, capacitor C2 and capacitor C3. When the switching element Q1 is turned ON, this causes the capacitor Ca to be charged through the diode Db and inductor La. When the switching element Q1 is turned OFF, energy so far stored in the inductor La is discharged through a parasitic diode of the switching element Q2 and the diode Db to charge the capacitor Ca. That is, when the switching elements Q1 and Q2 are alternately turned ON and OFF, this causes the capacitor Ca to be charged.

In the prior art, when the valley filling circuit 1 has a substantially constant voltage thereacross and when the voltage of the AC power source AC has such a waveform as shown in FIG. 2a, a current supplied from the inverter circuit INV to the load L has such a waveform as shown in FIG. 2b in which the current varies large at valley parts of the DC output voltage of the rectification circuit RE and varies small at mountain parts thereof. Meanwhile, the both-end voltage of the valley filling circuit 1 tends to be low in its waveform in the case of use of a smoothing capacitor and to be high in the case of no use of the smoothing capacitor. Since the load supply current from the inverter circuit INV to the load L varies large at valley parts of the DC output voltage of the rectification circuit RE and small at mountain parts thereof, only the valley filling circuit 1 is used as a power supply to the inverter circuit INV, the load supply current varies large at mountain parts of the DC output voltage of the rectification circuit RE and varies small at valley parts thereof as shown in FIG. 2c. Thus, with the circuit configuration of FIG. 1, the current supplied from the inverter circuit INV to the load L has such a waveform corresponding to a combination of the current waveforms of FIGS. 2b and 2c, as shown in FIG. 2d. That is, the use of the valley filling circuit 1 enables peak values of the current waveform of FIG. 2b to be reduced, which eventually leads to the fact that the current waveform of the supply current from the inverter circuit INV to the load L has peaks at mountain and valley parts of the DC output voltage of the rectification circuit RE and thus the current variation can be made smaller than that of the prior art configuration.

Figure 3:
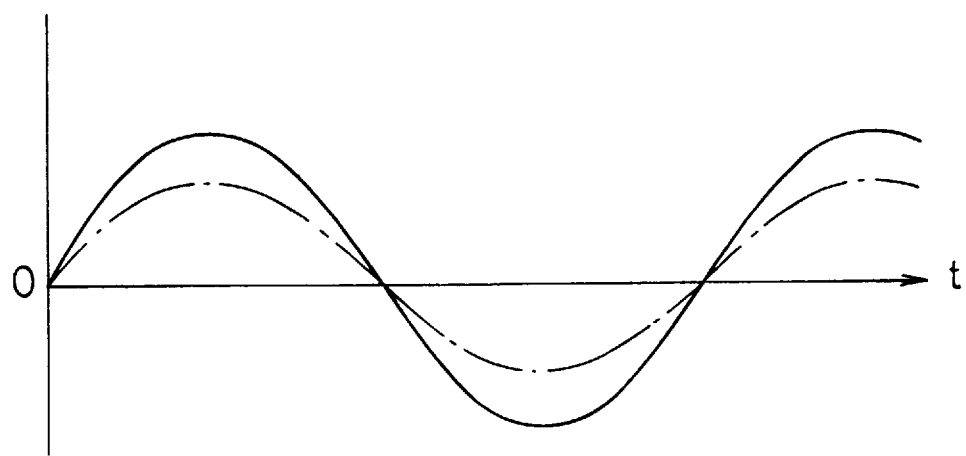
FIG. 3 is a graph for explaining the operation of the circuit of FIG. 1.

Further, since the variation period corresponds only to nearly ¼ of the variation period of the voltage of the AC power source AC, when a discharge lamp is employed as the load L, the flickering of the lamp can be suppressed by both effects that the variation width of the supply current is small and its period becomes short. Furthermore, since the input current has no halt period because it is always supplied to the inverter circuit INV, the input current distortion can be improved. Since an input voltage waveform shown by a solid line in FIG. 3 is similar to an input current waveform shown by a chain-doted line in FIG. 3, further, an input power factor can also be improved. In addition, since the capacitor Cb has a smaller capacitance and the capacitor Ca having a larger capacitance is not connected directly to the output terminal of the rectification circuit RE, substantially no rush current takes place at the time of turning ON the power.

Figure 4:
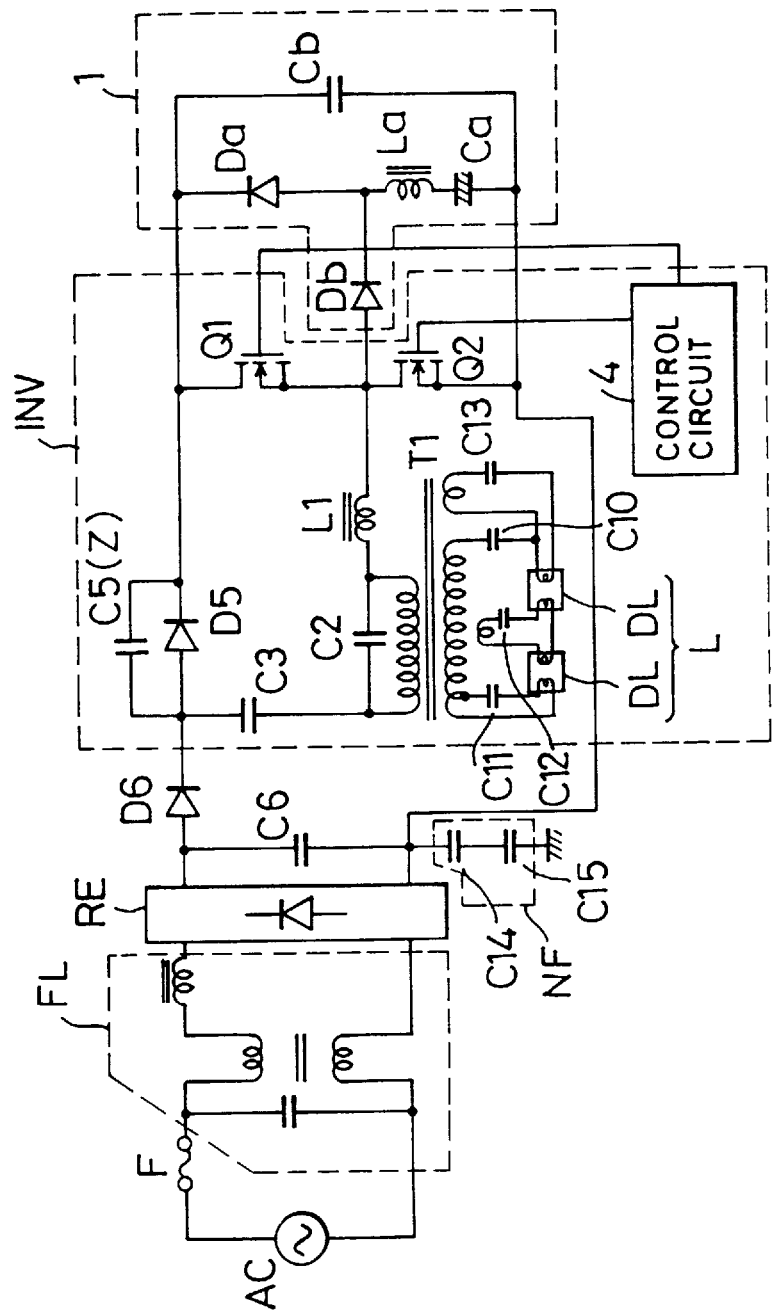
FIG. 4 is a specific circuit diagram of the embodiment of FIG. 1.

A specific circuit of the present embodiment when two discharge lamps DL are used as the load L is shown in FIG. 4. In the circuit of FIG. 4, a primary winding of an output transformer T1 is connected across the capacitor C2, and a series circuit of the two discharge lamps DL is connected across a secondary winding of the output transformer T1 through a DC cut-off capacitor C10. Also connected to filaments of the respective discharge lamps DL are preheating windings of the output transformer T1 through capacitors C11 to C13 for prevention of short-circuiting of the filaments. The both switching elements Q1 and Q2, which comprise MOS FETs, are alternately turned ON and OFF at a constant frequency by a control circuit 4. The impedance element Z comprises a capacitor C5 across which a diode D5 is wired. Further, a capacitor C6 is connected between the DC output terminals of the rectification circuit RE, and a series circuit of capacitors C14 and C15 grounded at its one end is connected as a noise preventing filter NF to negative polarity one of the DC output terminals of the rectification circuit RE. Inserted between the AC power source AC and the rectification circuit RE via a fuse F is a filter circuit FL which acts to prevent high frequency noise from being passed to the AC power source AC together with the filter circuit FL. Also inserted between positive polarity one of the DC output terminals of the rectification circuit RE and the capacitor C5 is a diode D6 for prevention of reverse current. Other arrangement and operation are substantially the same as those of the circuit arrangement of FIG. 1.

Figure 5:
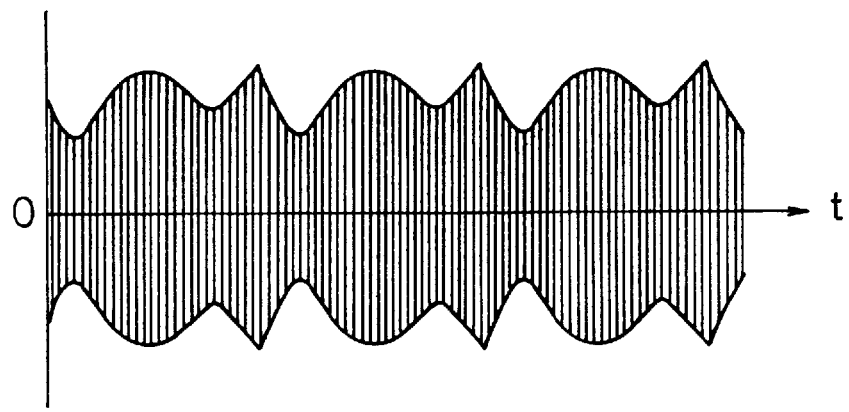
FIG. 5 is a graph for explaining the operation of the circuit of FIG. 4.

With such a circuit arrangement, when the capacitor Ca has a constant capacitance, a voltage across the capacitor Ca, i.e., the degree of filling valley parts in the DC output voltage of the rectification circuit RE is determined by the switching frequency and on duty of the switching element Q2 and by the magnitude of the inductor La. For this reason, the switching frequency and the inductor La are set so that a current supplied to the load L has the lowest crest factor (=current peak value/current effective value). With this circuit arrangement, when the switching frequency and the inductor La are set as mentioned above, the current supplied to the load L had such a waveform having a crest factor of 1.7 as shown by FIG. 5. It will be appreciated that the prior art circuit arrangement has a crest factor of 2.0 or more and, when the circuit arrangement of the present invention is employed, fluctuations in the current supplied to the load L can be suppressed.

(Embodiment 2)

Figure 6:
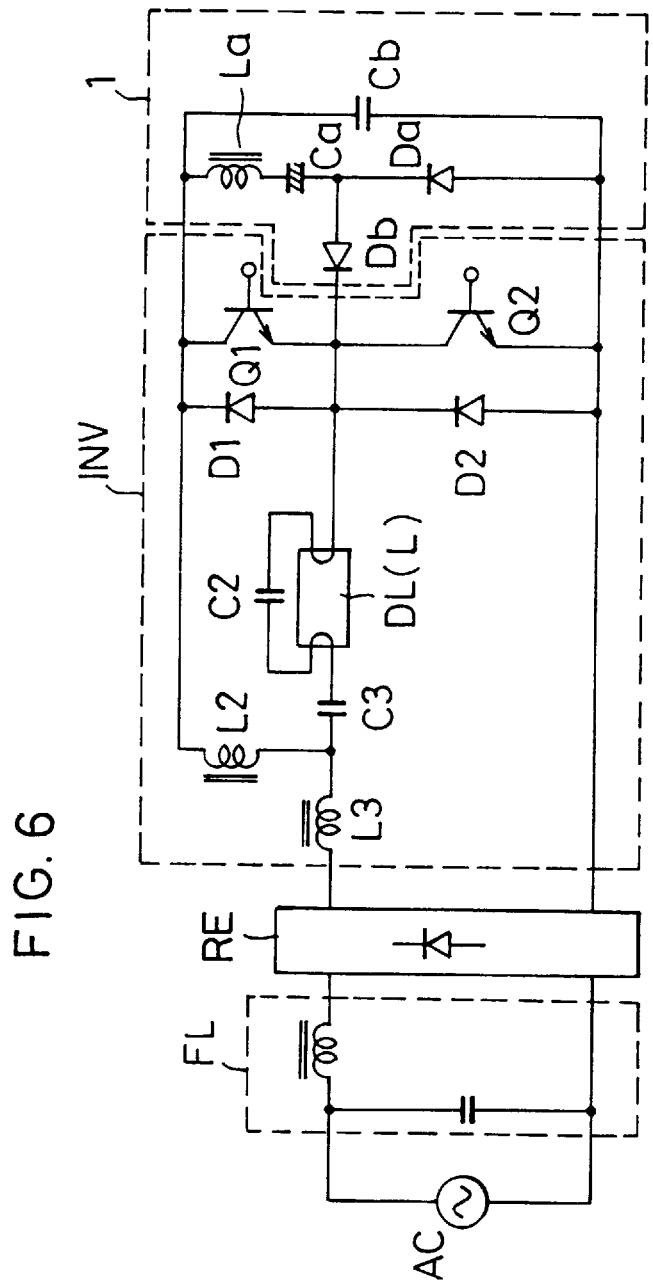

In the present embodiment, as shown in FIG. 6, the impedance element Z comprises an inductor L2 and the inductor L2 is also used as a constituent element of a resonance circuit in the inverter circuit INV. In more detail, the switching elements Q1 and Q2 comprise bipolar transistors and a discharge lamp DL having filaments is used as the load L. Connected between the DC output terminals of the rectification circuit RE are a series circuit of two inductors L2 and L3 and the switching elements Q1 and Q2 as well as a series circuit of an inductor L3, capacitors C2 and C3, the filaments of the discharge lamp DL and switching element Q2. Connected to the switching elements Q1 and Q2 are flywheel diodes D1 and D2 respectively in inverse parallel thereto. Further, the filter circuit FL is provided between the AC power source AC and rectification circuit RE to prevent high frequency noise from being passed to the AC power source AC.

The valley filling circuit 1 has such an arrangement that, in the valley filling circuit 1 of the embodiment 1, the series circuit of the inductor La and capacitor Ca is reversed in position to the diode Da so that the diode Da is connected to the negative polarity terminal and the connection polarity of the diode Db is reversed. The valley filling circuit 1 of the present embodiment is different from the valley filling circuit 1 of the embodiment 1 in that, when the switching element Q1 is turned ON, the capacitor Ca is charged through the inductor La in the valley filling circuit 1 of the embodiment 1, whereas, when the switching element Q2 is turned ON, the capacitor Ca is charged thought the inductor La in the valley filling circuit 1 of the present embodiment. Other circuit arrangement is substantially the same as that of the embodiment 1, and the operation of the inverter circuit INV having substantially the same circuit arrangement as in the present embodiment is substantially the same as that described in U.S. Pat. No. 5, 274, 540.

This circuit arrangement also operates in substantially the same manner as in the embodiment 1. When high frequency operation of the inverter circuit INV causes a potential at a junction point between the both inductors L2 and L3 to drop down to the DC output voltage of the rectification circuit RE, a current flows from the rectification circuit RE to the inverter circuit INV via the inductor L3 and the resonating operation of the inverter circuit INV causes the capacitor Ca of the valley filling circuit 1 to be charged. In this circuit, different resonance circuits are established for mountain and valley parts of the DC output voltage of the rectification circuit RE, so that, as shown in FIG. 2b, the valley part of the current supplied to the load L becomes more than the mountain part thereof. Meanwhile, since the valley filling circuit 1 reverses a relationship between the DC output voltage of the rectification circuit RE and the current supplied to the load L to the inverter circuit INV, fluctuations in the current supplied to the load L can be suppressed as in the embodiment 1. Further, since the rectification circuit RE always supplies the voltage to the inverter circuit INV through the high frequency operation of the inverter circuit INV, there is no pause period in the input current and the input current distortion is reduced. Other arrangement and operation are substantially the same as those of the embodiment 1.

(Embodiment 3)

Figure 7:
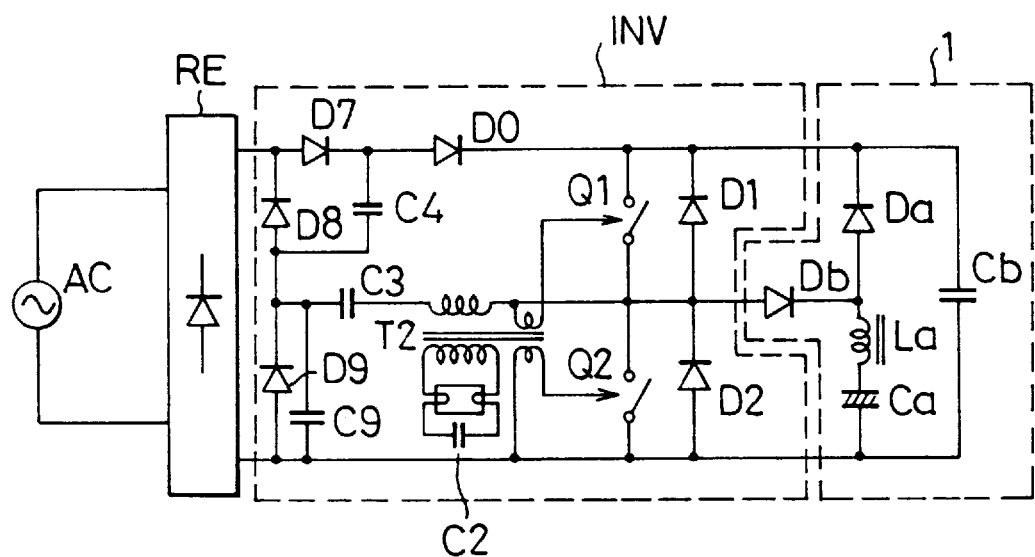
FIGS. 6 to 9 are schematic circuit diagrams of power supply devices in accordance with second to fifth embodiments of the present invention, respectively.

In the present embodiment of FIG. 7, the discharge lamp DL having filaments is used as the load L and the capacitor C2 is connected to one ends of the both filaments. Connected between the other ends of the both filaments is a secondary winding of an output transformer T2 which primary winding is used as the inductor L1 forming part of the resonance circuit. Also provided to the output transformer T2 are two feedback windings so that voltages induced in the feedback windings are used to turn ON and OFF the respective switching elements Q1 and Q2. In other words, the feedback windings are connected in such polarities as to cause alternate turning ON and OFF of the both switching elements Q1 and Q2, whereby the inverter circuit INV performs so-called self-oscillating operation while eliminating the need for receiving an external control signal. A diode D7 is inserted between positive polarity one of the DC output terminals of the rectification circuit RE and a diode DO, a series circuit of diodes D8 and D9 is connected between the DC output terminals of the rectification circuit RE, and the capacitor C3 is at its one end connected to a junction point between the both diodes D8 and D9. Further a capacitor C9 is connected to the diode D9 which forms part of a discharging path of the valley filling circuit 1 in parallel thereto. A capacitor C4 is connected between the cathode of the diode D7 and the anode of the diode D8. Other arrangement and operation is substantially the same as those of FIG. 3, and the operation of an inverter circuit INV similar to that in the present invention is described in U.S. Pat. No. 5, 134, 344.

(Embodiment 4)

Figure 8:
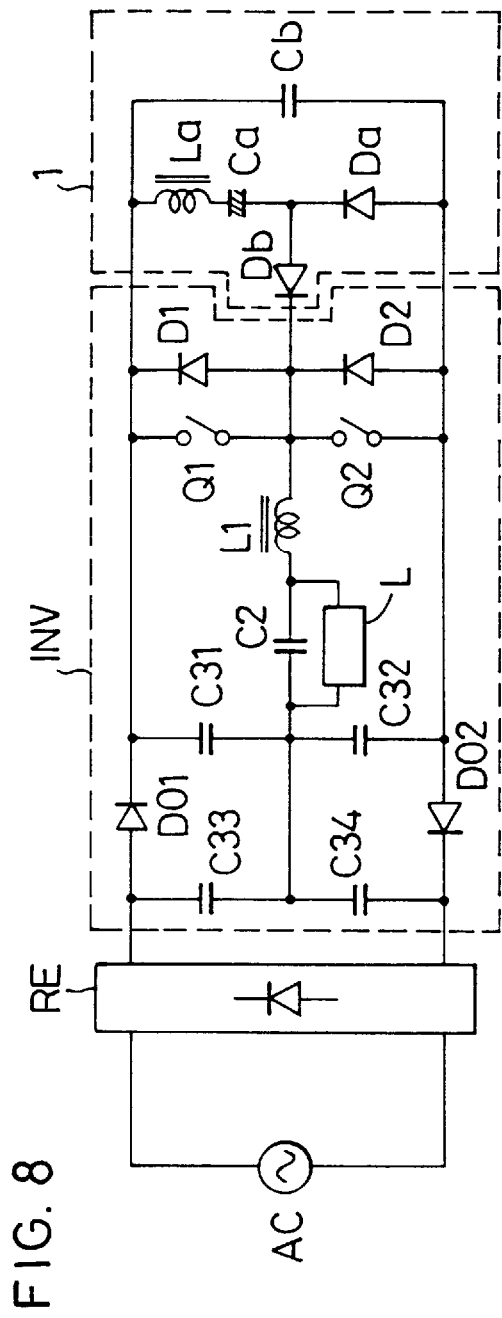

In the present embodiment, as shown in FIG. 8, a socalled half bridge type circuit is employed as the inverter circuit INV, series circuits of pairs of capacitors C31 and C32 and capacitors C33 and C34 are connected at their one ends with a diode D01 and at the other ends with a diode D02, a junction point between the capacitors C31 and C32 is connected directly to a junction point between the capacitors C33 and C34, and a series circuit of the capacitor C2 and inductor L1 is provided between the junction point between the capacitors C31 and C32 and the junction point between the switching elements Q1 and Q2. The load L is wired across the capacitor C2. Other arrangement and operation are substantially the same as those of the embodiment 1, and the operation of an inverter circuit INV similar to that in the present embodiment is explained in U.S. Pat. No. 4,511,823.

With the above circuit configuration, the diodes D01 and D02 are ON at mountain parts of the DC output voltage of the rectification circuit RE but are OFF at valley parts thereof, so that the resonance conditions vary with the mountain and valley parts and thus the resonance frequency at the mountain parts becomes lower than that of the valley parts.

Accordingly, the current supplied to the load L at the mountain parts becomes less than that of the valley parts as in the embodiment 1, but the provision of the valley filling circuit 1 enables suppression of variations in the current supplied to the load L.

(Embodiment 5)

Figure 9:
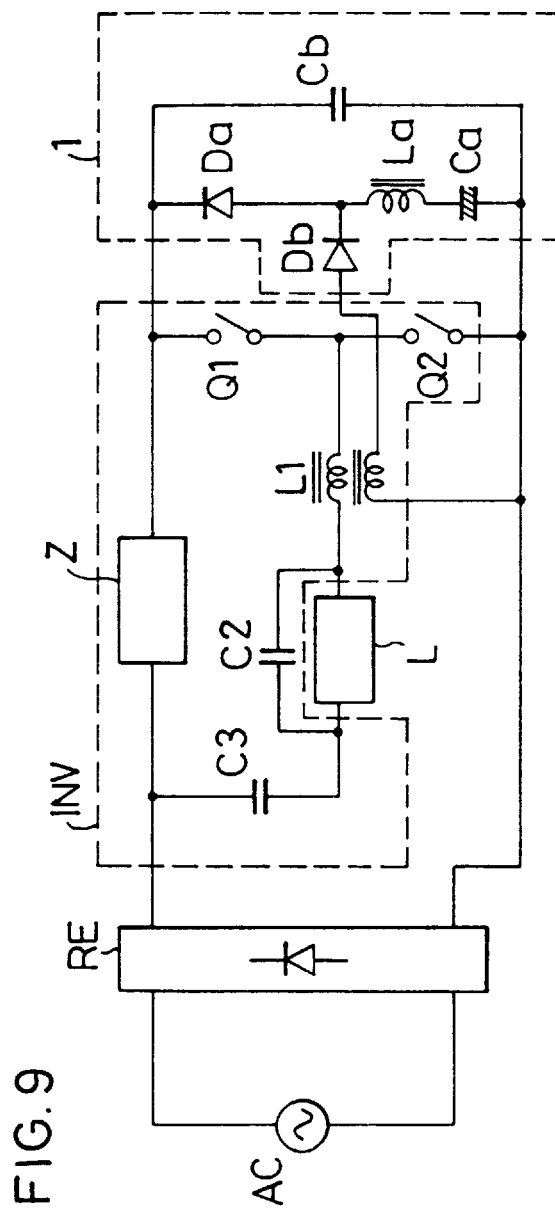
Figure 10A:
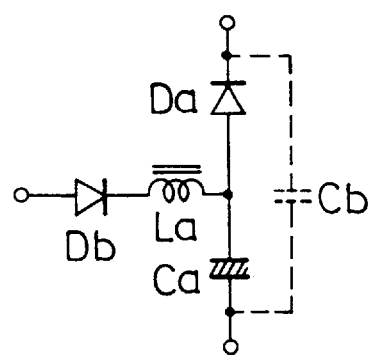
FIG. 10a to FIG. 10d show specific circuit diagrams of other modifications of a valley filling circuit appliable in FIGS. 1 and 6 to 9.
Figure 10B:
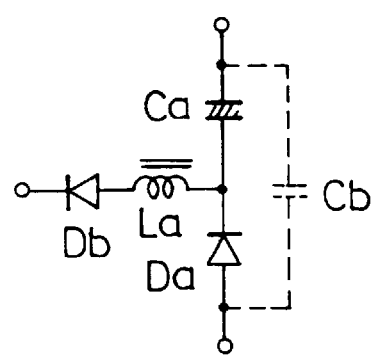
Figure 10C:
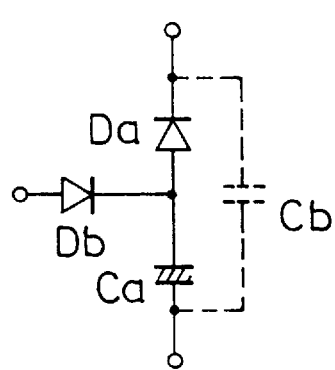
Figure 10D:
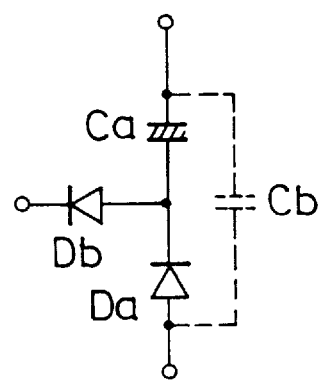

The present invention is arranged so that, as shown in FIG. 9, a feedback winding is provided to the inductor L1 of the resonance circuit used in the arrangement of the embodiment 1, and the anode of the diode Db provided in the valley filling circuit 1 is connected not to the junction point between the both switching elements Q1 and Q2 but to one end of the feedback winding of the inductor L1. Connected to the other end of the feedback winding of the inductor L1 is negative polarity one of the DC output terminals of the rectification circuit RE. Even this arrangement operates in substantially the same manner as in the embodiment 1.

The valley filling circuit 1 used in each of the foregoing embodiments may be replaced by such an arrangement as shown in FIG. 10. In any of the valley filling circuits 1 shown in FIGS. 10a to 10d, both of upper and lower ends of the valley filling circuit 1 are connected across the series circuit of the both switching elements Q1 and Q2 in the inverter circuit INV, and a left end of the diode Db as its one end is connected to the junction point between the both switching elements Q1 and Q2 of the inverter circuit INV. As shown in FIGS. 10a and 10b, when the inductor La is inserted (as in each of the foregoing embodiments), the inductor La is inserted in the charging path to the capacitor Ca, so that a regenerative current of the inductor La can be utilized to increase its energy utilization efficiency. Further, as shown by a dotted line, the capacitor Cb is connected in parallel to a series circuit of the capacitor Ca and diode Da, the capacitor Cb is used for bypassing high frequency components. However, the capacitor Cb may be omitted as necessary.

(Embodiment 6)

Figure 11:
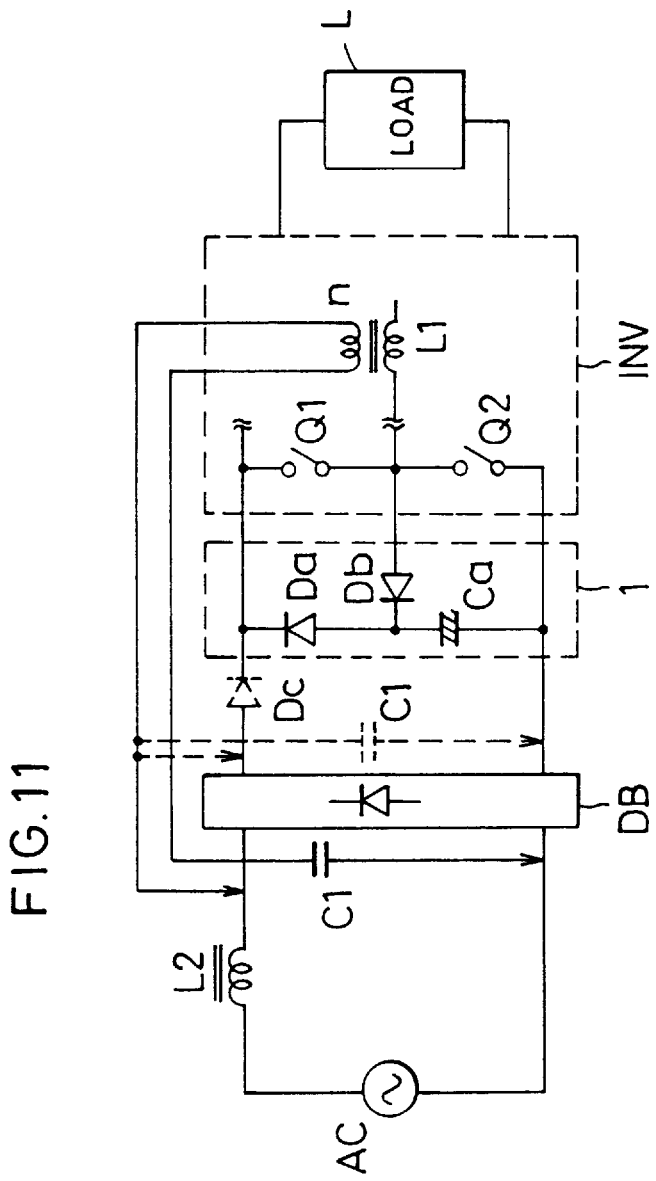
FIG. 11 to 14 are schematic circuit diagrams of power supply devices in accordance with sixth to ninth embodiments of the present invention, respectively.

FIG. 11 shows a schematic block diagram of an embodiment of the present invention. As shown in FIG. 11, a power supply device of the present embodiment is configured so that a diode bridge DB is connected across the AC power source AC through the inductor L2 as a high-frequency cut-off filter so that the inductor L2 removes high frequency components from the voltage of the AC power source, the diode bridge DB performs full-wave rectifying operation over the high-frequency-component-removed voltage to obtain a pulsative power voltage, the pulsative voltage is supplied to the inverter circuit INV through the valley filling circuit 1, a high frequency AC voltage as an output of the inverter circuit INV is supplied to the load L and is also fed back to an input of the diode bridge DB through the capacitor C1 as a low-frequency cut-off filter and through a feedback winding n which is magnetically coupled with the inductor Li. That is, in the present embodiment, the above valley filling circuit 1 forms part of the power supply.

In the valley filling circuit 1 as part of the power supply, a series circuit of two diodes Da and Db is connected across the switching element Q1 in the inverter circuit INV, and the electrolytic capacitor Ca is connected between a junction point between the diodes Da and Db and an output end of the diode bridge DB. In the illustrated example, the diode Da is for discharging the charge accumulated in the capacitor Ca, while the diode Db is for rectifying the high frequency output of the inverter circuit INV to charge the capacitor Ca and for preventing reverse current of the charge accumulated in the capacitor Ca.

In the inverter circuit INV, a resonance circuit of the inductor L1, capacitor (not shown), etc. is connected across the switching element Q1 and the switching element Q2 is connected in series with the switching element Q1, so that the two switching elements Q1 and Q2 are alternately turned ON and OFF by a control means (not shown) to generate a high frequency voltage that is supplied to the load L. The feedback winding n for feedback of a high frequency voltage induced in the inductor L1 is connected to the input end of the diode bridge DB through the capacitor C1. In this conjunction, the arrangement of the inverter circuit INV is not re stricted to the above specific example.

With the aforementioned arrangement, a load current supplied from the inverter circuit INV to the load L has peak values at both of the valley and mountain parts of a pulsative voltage obtained by full-wave rectifying the AC voltage of the AC power source AC through the diode bridge DB, so that, when the peak values are suppressed, distortion in the input current can be improved and fluctuations (ripples) in the load current can be reduced with a simple circuit configuration. In the case where a discharge lamp is used as the load L, when such a load current as mentioned above is supplied to the discharge lamp, the interval between the peak values in the load current (lamp current) can be made narrow, which advantageously results in that flickering of the discharge lamp can be reduced to such an extent as not to be noticeable.

In this connection, as shown by dotted lines in FIG. 11, the feedback winding n and capacitor C1 may be connected to the output ends of the diode bridge DB. Further, a diode Dc may be connected between one of the output ends of the diode bridge DB and the cathode of the diode Da of the valley filling circuit 1. the diode Dc being connected at its anode to the diode bridge DB. When such a diode Dc is connected, the diode Dc is switched between its conducted and not-conducted states are switched depending on the magnitude relationship between the pulsative output of the diode bridge DB and the output of the valley filling circuit 1, so that the input current can be made to flow from the AC power source AC throughout substantially a full of one period of the AC voltage of the AC power source AC and thus a pause period of the input current can be eliminated.

(Embodiment 7)

Figure 12:
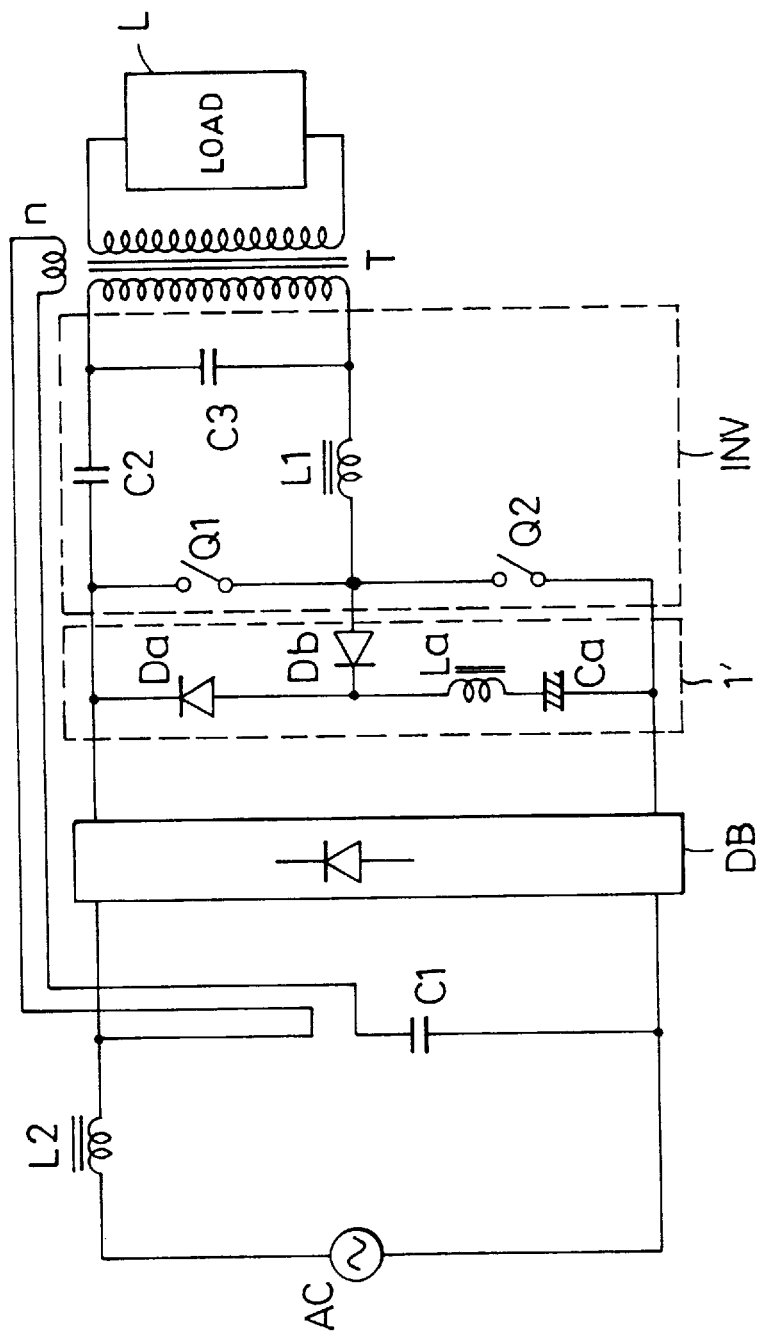

The seventh embodiment of the present invention is shown in FIG. 12 by its schematic circuit diagram. The operation of a power supply device of the present embodiment is substantially the same as that of the embodiment 6 and a load current having such a waveform as shown in FIG.

2d is supplied to the load L. An input current from the AC power source AC has a sinusoidal waveform having substantially the same phase as the AC power source voltage. In the present embodiment, the choke coil La is connected to the capacitor Ca so as to control the charging operation of the capacitor Ca through an abrupt high frequency output of the choke coil. Though an insulating transformer T is used to cause the feedback winding n to feed the high frequency voltage back to the input ends of the diode bridge DB in the present embodiment, the present invention is not limited to the above means for feedback of the high frequency voltage.

(Embodiment 8)

Figure 13:
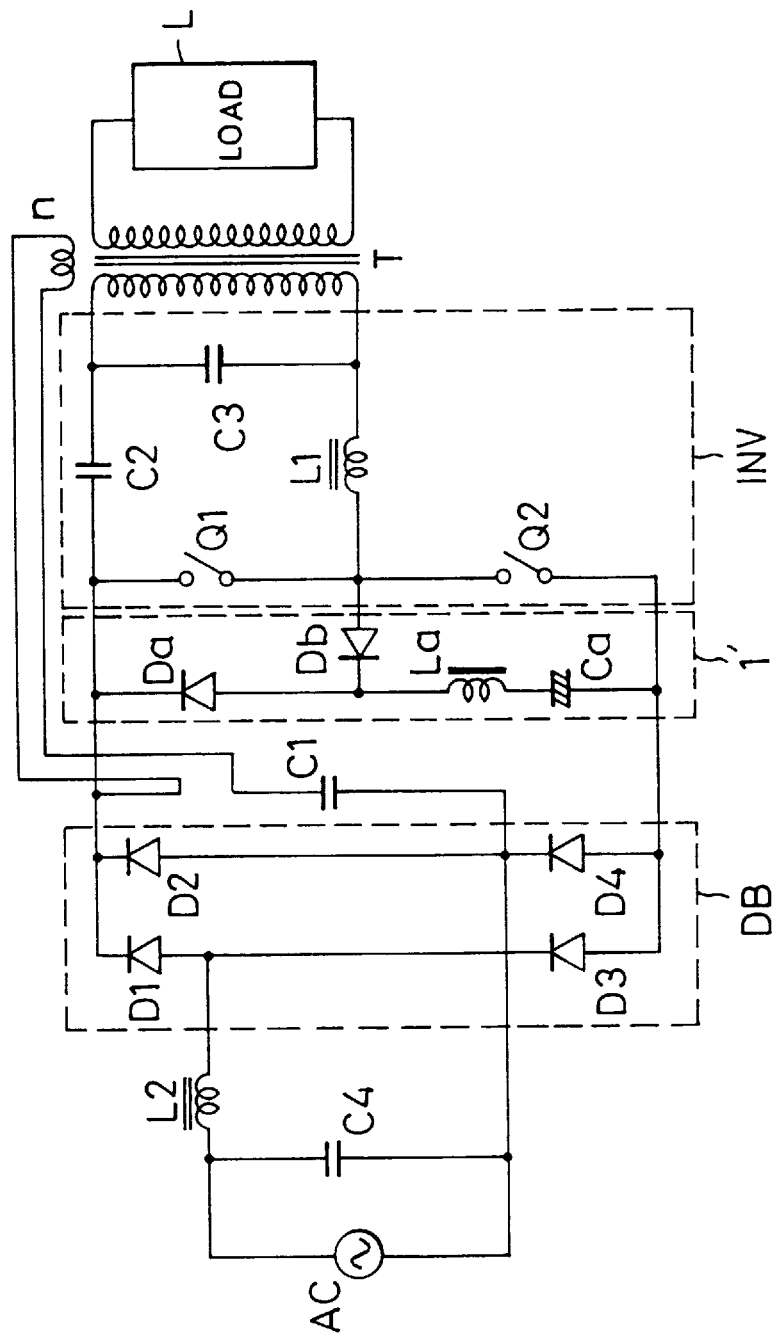

Shown in FIG. 13 is a schematic circuit diagram of an eighth embodiment of the present invention. In a power supply device of the present embodiment, a diode D2 in the diode bridge DB is turned ON and OFF by a high frequency voltage fed back by the feedback winding n so that a high frequency input current is supplied to the inverter circuit INV, whereby distortion in the input current is improved. Further, the degree of contribution of a series circuit of the inductor L2 of a filter circuit connected across the AC power source AC and the capacitor C1 connected in series with the feedback winding n with respect to the inverter circuit INV via the insulating transformer T is different between the mountain and valley parts of a pulsative output voltage of the diode bridge DB.

That is, the resonating operation of the inverter circuit INV is less affected by the series circuit of the inductor L2 and capacitor C1 at the mountain parts of the pulsative voltage while is more affected thereby at the valley parts thereof, which results in that a load current having such a waveform as shown in FIG. 2b flows. Since the valley filling circuit 1 is provided between the diode bridge DB and inverter circuit INV in the present embodiment, however, the load current having such a waveform as shown in FIG. 2c flows as in the foregoing embodiments 6 and 7. Thus, in the power supply device of the present embodiment, these mutually contradictory 2 circuit operations cause the load current to flow with such a waveform as shown in FIG. 2d, similar to the waveforms of the embodiments 1 and 1.

(Embodiment 9)

Figure 14:
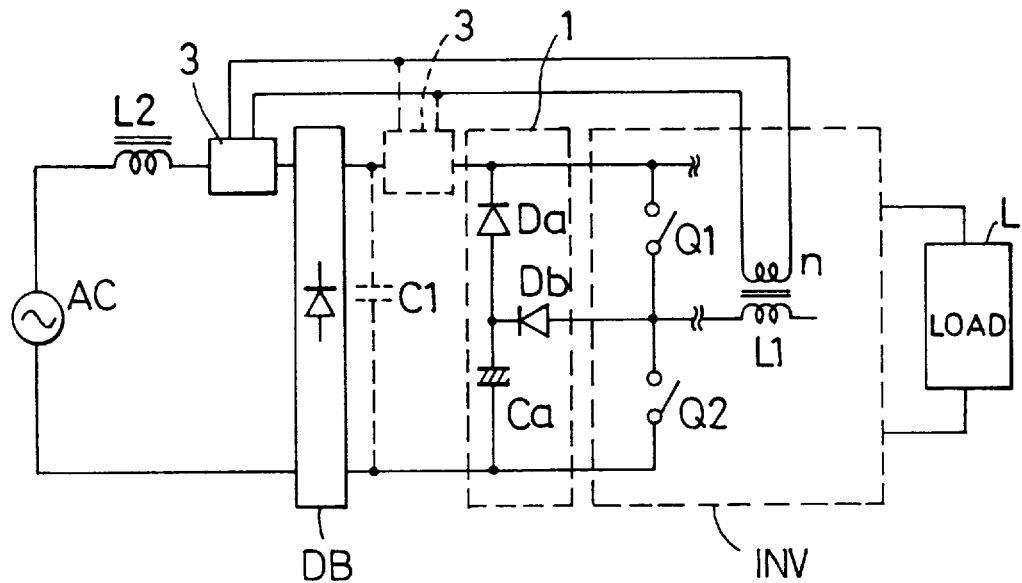

FIG. 14 is a schematic circuit diagram of a ninth embodiment of the present invention. A power supply device of the present embodiment is featured in that, in place of the connection of the series circuit of the feedback winding n and capacitor C1 across the input ends of the diode bridge DB in the arrangement of the embodiment 6, a feedback circuit 3 having the feedback winding n is connected between one of the output ends of the diode bridge DB and the valley filling circuit 1 in series therewith.

Figure 15:
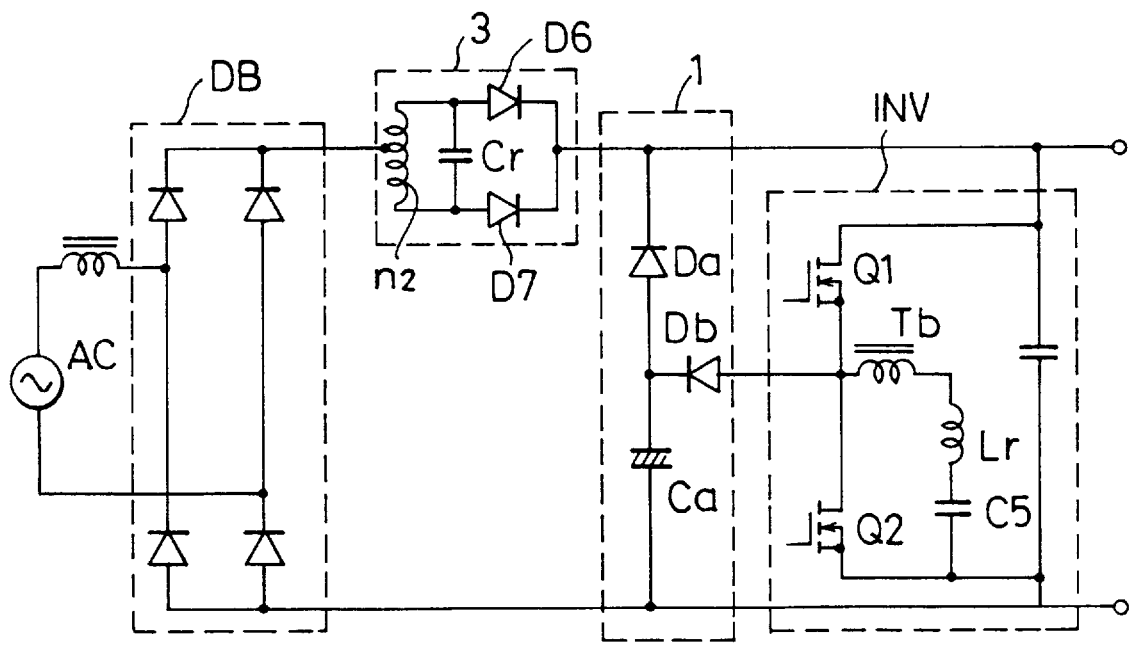
FIG. 15 is a specific circuit diagram of the embodiment of FIG. 14.

More specifically, as shown in FIG. 15 by a more detailed circuit diagram, the valley filling circuit 1 is provided between the output end of the diode bridge DB and the inverter circuit INV.

With the power supply device of the present embodiment, a secondary winding n2 of a feedback transformer Tb and a capacitor Cr are wired between anodes of a pair of diodes D6 and D7 in parallel thereto to form the feedback circuit 3, the power source voltage of the AC power source AC is full-wave rectified by the diode bridge DB to obtain a pulsative voltage, a high frequency voltage is superimposed on the obtained pulsative voltage by the feedback circuit 3 to alternately turn ON the diodes D6 and D7 at a high frequency, thereby improving the distortion of the input current. Further, the degree of contribution of the capacitor Cr of the feedback circuit 3 to the inverter circuit INV via the insulating transformer Tb is different between the mountain and valley parts of a pulsative output voltage of the diode bridge DB. Thus, the resonating operation of the inverter circuit INV is less affected by the capacitor Cr at the mountain parts of the pulsative voltage while is more affected thereby at the valley parts thereof, which results in that a load current having such a waveform as shown in FIG. 2b flows. Since the valley filling circuit 1 is provided between the diode bridge DB and inverter circuit INV in the present embodiment, however, the load current having such a waveform as shown in FIG. 2c flows as in the foregoing embodiments 1 to 3. Thus, in the power supply device of the present embodiment, these mutually contradictory 2 circuit operations cause the load current to flow with such a waveform as shown in FIG. 2d, similar to the waveforms of the embodiments 1 and 1.

In this connection, as shown by a dotted line in FIG. 15, the feedback circuit 3 may be connected to the output of the diode bridge DB. In this case, the capacitor C1 is connected between the feedback circuit 3 and the diode bridge DB in parallel thereto.

(Embodiment 10)

Figure 16:
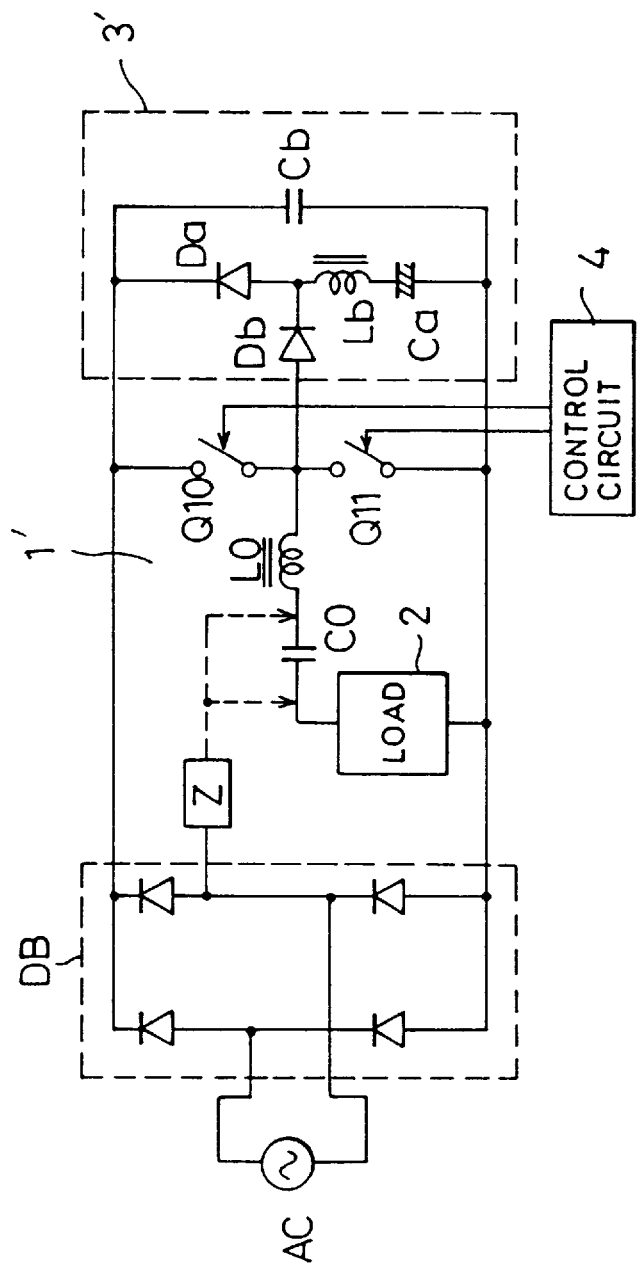
FIGS. 16, 16a, 17, 18, 18a, 19 and 20 are schematic circuit diagrams of power supply devices in accordance with tenth to fourteenth embodiments of the present invention, respectively.

Shown in FIG. 16 is a circuit of the present embodiment, in which a series circuit of switching elements Q10 and Q11 in an inverter section 1' as well as a power supply section 3' are connected between the output ends of the diode bridge DB for full-wave rectification of the power voltage of the AC power source AC respectively. Further connected to the switching element Q10 of the inverter section 1' is a series resonance circuit of a choke LO, a capacitor CO and a load 2. The diode bridge DB is connected at its input end via the impedance element Z to a junction point between the capacitor CO and load 2 or between a junction point between the capacitor CO and choke LO. The switching elements Q10 and Q11 are alternately turned ON and OFF by the control circuit 4. In the power supply section 3', a capacitor Cb having a capacitance much smaller than that of the electrolytic capacitor Ca is connected across a series circuit of the diode Da, choke Lb and capacitor Ca. Since the capacitor Cb for regenerative current has a small capacitance, a rush current at the time of turning ON the power is very small.

In the present embodiment, the capacitor Ca is previously charged through the choke Lb when the switching element Q10 is turned ON in the vicinity of a peak value of a pulsative output voltage of the diode bridge DB, whereas the charge of the capacitor Ca is discharged through the diode Da to supply the voltage to the inverter section 1' in the vicinity of 0 V of the pulsative output voltage of the diode bridge DB.

In the inverter section 1', the alternate turning ON and OFF of the switching elements Q10 and Q11 causes the input current to have such a waveform nearly similar to that of the AC power source AC voltage as shown in FIG. 2a, thus resulting in that such a load current flows that increases and decreases in the opposite direction to the increase and decrease of the voltage of the AC power source AC. As a result, the load current has such a waveform as shown in FIG. 2b while the load current of the power supply section 3' has such a waveform as shown in FIG. 2c.

Accordingly, when the both load current waveforms are combined, the peak values of the combined load current waveform are lowered as shown in FIG. 2d and the combined waveform has a mountain peak part and a valley peak part in the voltage waveform after subjection of the AC power source AC of FIG. 2a to a full-wave rectification. Thus, the combined load current output can be nearly constant.

In other words, the power supply section 3' is operated to cause the power voltage of the inverter section 1' to have such a waveform that drops at valley parts of the waveform of the pulsative voltage after the AC power source AC is subjected to the full-wave rectification, whereas the inverter section 1' is operated, as already explained in the prior art, so that the two resonating operations cause the load output to become maximum at the valley parts of the waveform of the pulsative voltage after the subjection of the AC power source AC to the full-wave rectification. As a result, the mutually contradictory two circuit operations enable the load current to have such a waveform as shown in FIG. 2d.

Further, since the charging operation of the capacitor Ca in the power supply section 3' is carried out at a high frequency of the inverter section 1', no rush current flows at the time of turning ON the power.

Figure 16A:
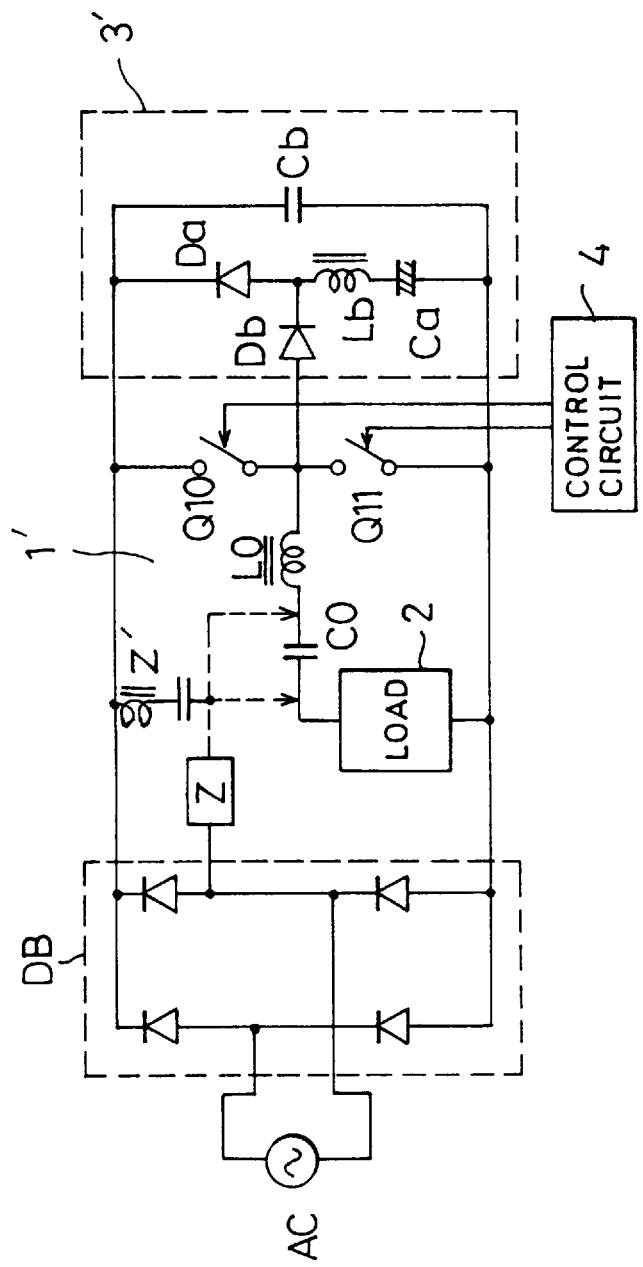

In addition, another modification of the embodiment 10 is shown in FIG. 16A, in which an impedance circuit Z' is connected to one of the output ends of the diode bridge DB and the impedance Z is connected at its one end with the inverter section 1', so that the resonating operation of the inverter section 1' causes a high frequency voltage at a junction point therebetween to be fed back to the power supply section 3' through the impedances Z and Z', which results in that the input current can be made to effectively flow throughout the entire period of the pulsative AC voltage.

(Embodiment 11)

Figure 17:
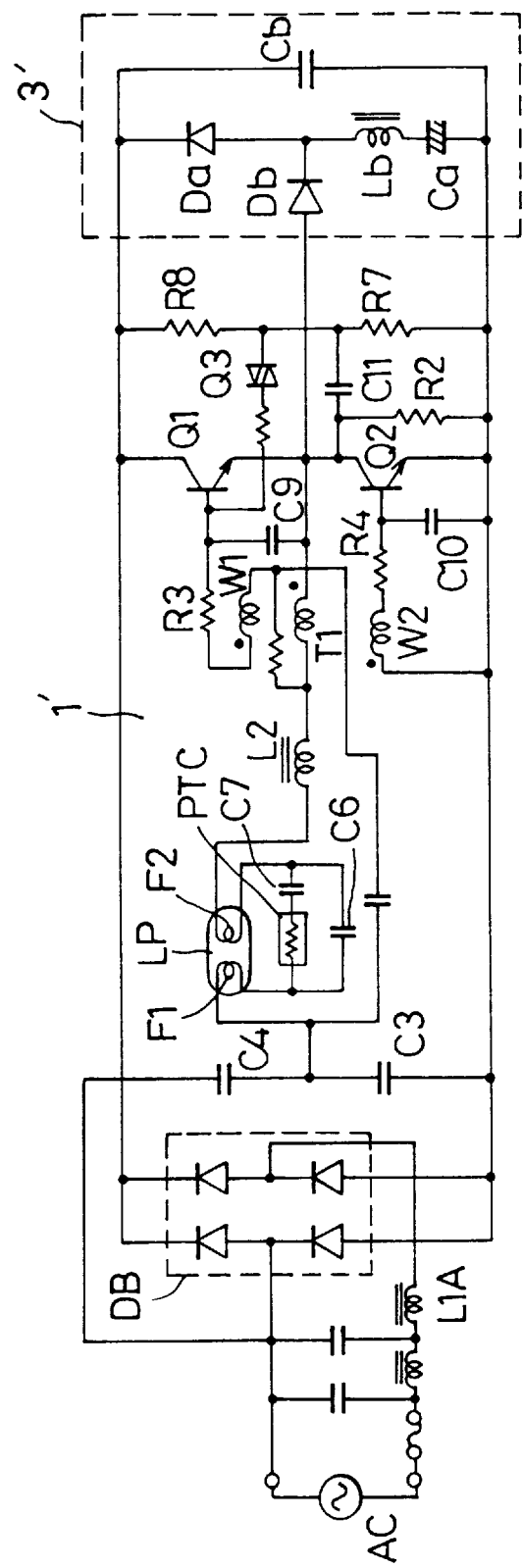

The present embodiment corresponds to the arrangement of the embodiment 10 but applied to U.S. Pat. No. 5,313, 142. In the present embodiment, more in detail, the electrolytic capacitor C2 provided in U.S. Pat. No. 5,313,142 is replaced by the power supply section 3' having a structure similar to that in the embodiment, as shown in FIG. 17. Further, a capacitor C4 is used in place of the impedance element Z in the embodiment 1.

In the present embodiment, a load current flowing through the inverter section 1' has such a waveform as shown in FIG. 2b and, as in the embodiment 10, a combined load current has such a waveform as shown in FIG. 2d. Accordingly. the input current has the same waveform as the voltage of the AC power source AC shown in FIG. 3, thus improving the distortion of the input current.

(Embodiment 12)

Although one of the input ends of the diode bridge DB is connected to part of the series resonance circuit of the inverter section 1' through the impedance element Z (capacitor C4) in the embodiments 10 and 11; one of the output ends of the diode bridge DB is connected via the diode DO to a series circuit of the switching elements Q10 and Q11 of the inverter section 1' and also to the power supply section 3', and a junction point between the diode DO and one of the output ends of the diode bridge DB is connected via the impedance element Z to part of the series resonance circuit of the inverter section 1'.

Figure 18:
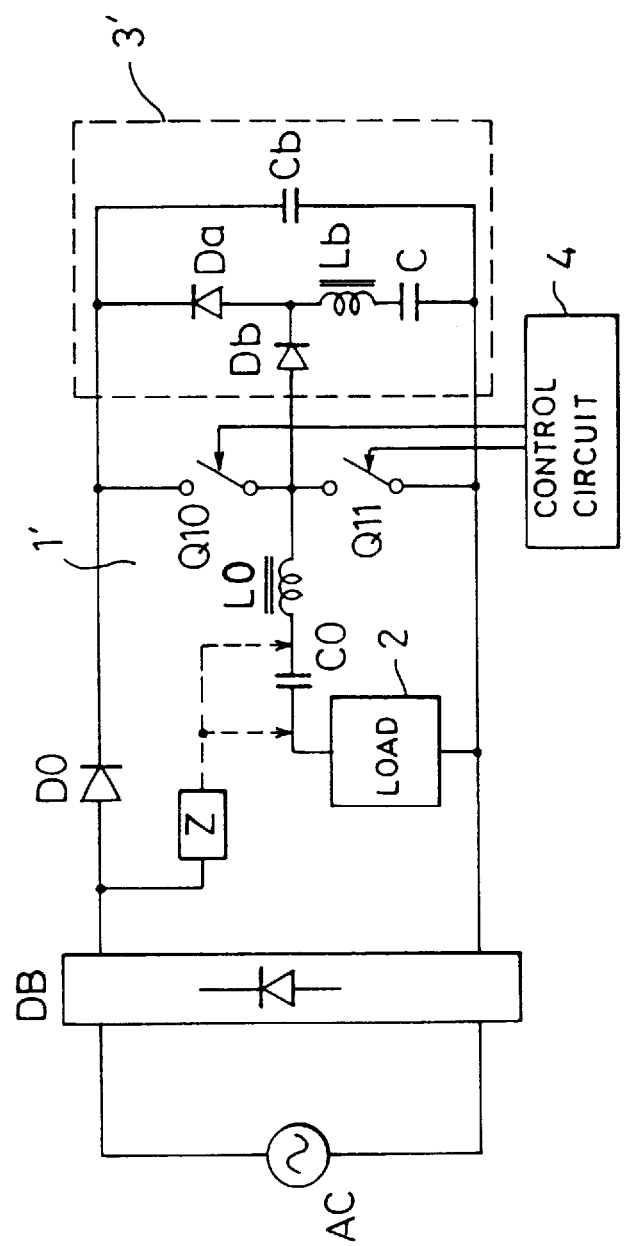

Even in the present embodiment, a combination of the waveform of the load current of the inverter section 1' and the waveform of the load current of the power supply section 3' corresponds to such a waveform as shown in FIG. 2d. That is, the combined waveform has lowered peak values at mountain part and valley parts of the waveform of the voltage of the AC power source AC, whereby a substantially constant load output can be obtained in FIG. 18 of the present embodiment.

Figure 18A:
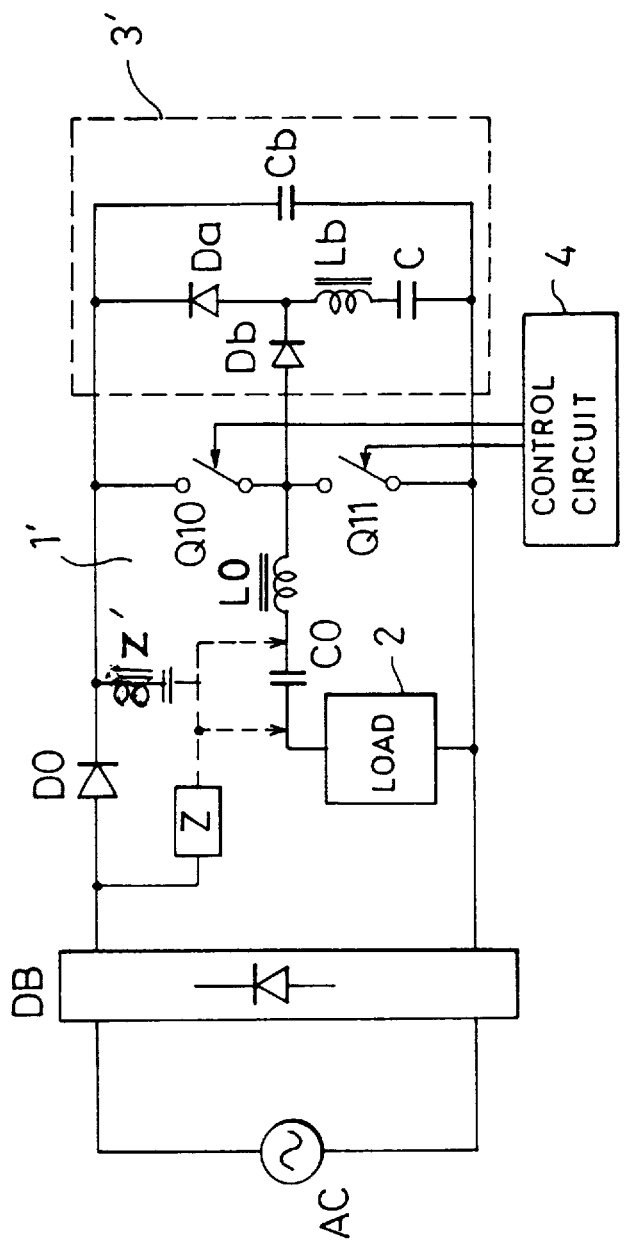

Even in this embodiment, a modification of the present embodiment with another inductance Z' substantially as in FIG. 16A may be provided as shown in FIG. 18A.

(Embodiment 13)

Figure 19:
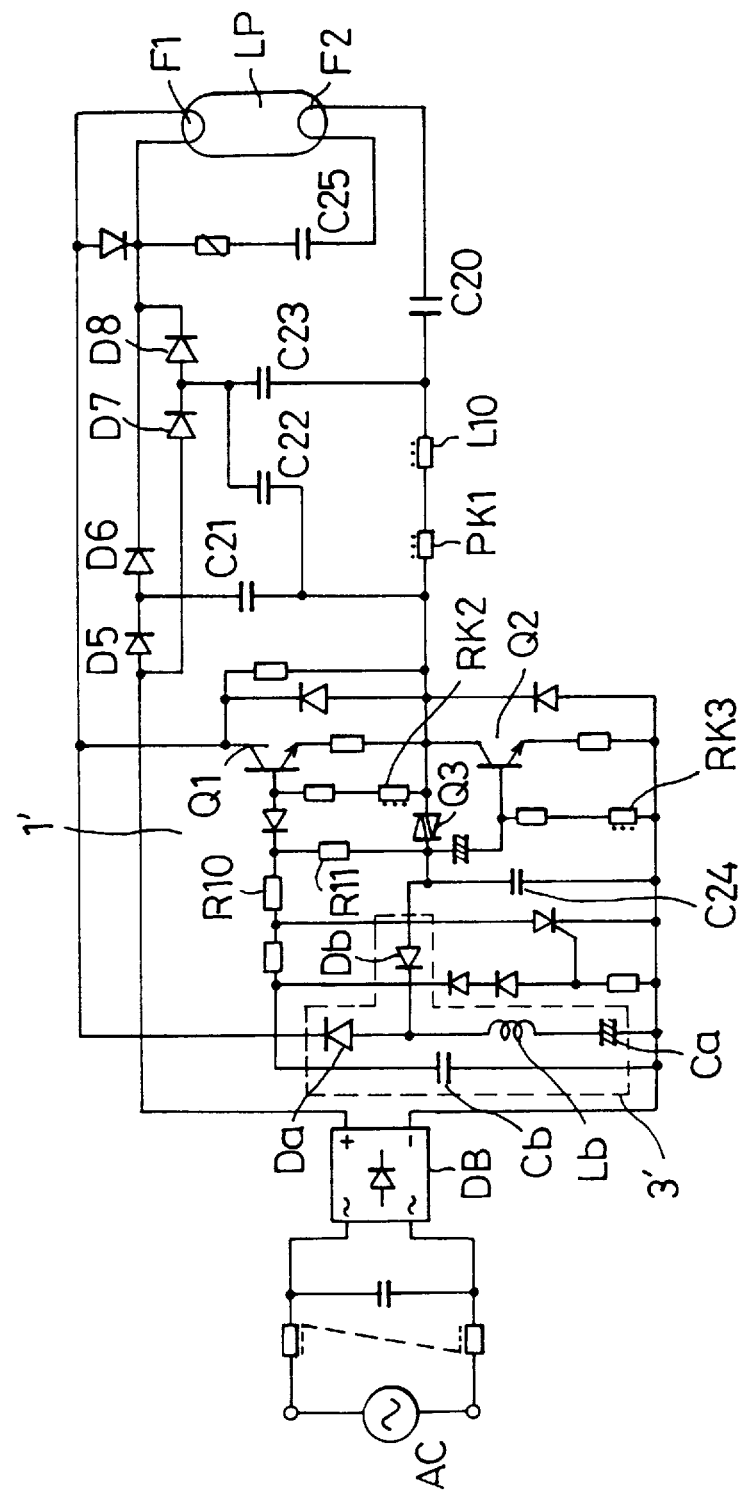

The present embodiment corresponds to such a circuit as disclosed in U.S. Pat. No. 4,949,013 to which the present invention is applied. In place of a smoothing capacitor in the circuit of the above patent, the power supply section 3' similar to in the embodiments 1 to 3 is used as shown in FIG. 19. In the circuit of the present embodiment, a series circuit of the transistors Q1 and Q2 of the inverter section 1' is connected to one of the output ends of the diode bridge DB via diodes D5 and D6 and a filament F1 of a discharge lamp LP. A series circuit of diodes D7 and D8 is connected across a series circuit of the diodes D5 and D6, a resonance capacitor C21 is connected between a junction point of the diodes D5 and D6 and a junction point of the transistors Q1 and Q2, a resonance capacitor C22 is connected between a junction point of the diodes D7 and D8 and the junction point of the transistors Q1 and Q2, and a resonance capacitor C23 is connected between the junction point of the diodes D7 and D8 and the junction point of the transistors Q1 and Q2 through a resonance choke L10 and a primary winding of a transformer PK1.

A resonance circuit part of the inverter section 1' includes the series circuit of the transistors Q1 and Q2, a coupling capacitor C20, a resonance choke L10, and capacitors C21 to C23 providing different resonating operations for mountain and valley parts of the pulsative output voltage of the diode bridge DB. Further, a start circuit for starting the transistor Q1 is provided which comprises resistors R10 and R11, a DIAC (diode AC switch) Q3 and a capacitor C24. Also connected to base/emitter circuits of the transistors Q1 and Q2 are feedback windings RK2 and RK3 of a transformer PK1 having a primary winding through the coupling capacitor C20 and resonance choke L10 between the discharge lamp LP and the junction point of the transistors Q1 and Q2, so that outputs of the feedback windings RK2 and RK3 cause self-oscillating operation.

The discharge lamp LP is connected across a capacitor C25 for performing resonating operation through a resonance circuit of the resonance choke L1, coupling capacitor C20 and capacitor C25 so that a high frequency voltage appearing across the capacitor C25 causes the lamp to be lit. Since the pulsative output voltage of the diode bridge DB obtained after rectification of the AC power source AC is applied to various points of the inverter section 1' via the diodes D5 to D7 and capacitors C21 to C23 as mentioned above, the resonating operation of the inverter section 1' is affected by the amplitude of the pulsative voltage obtained after rectification of the AC power source AC. The amplitude varies between the mountain and valley parts of the pulsative voltage of the diode bridge DB obtained after rectification of the AC power source AC, the resonating operation varies between the mountain and valley parts and thus the lamp current flowing the discharge lamp LP also varies, i.e., becomes low at the mountain parts, high at the valley parts and varies therebetween with a sinusoidal waveform of the AC power source AC. Accordingly the lamp current has substantially the same waveform as the load current shown in FIG. 2b.

Thus, in the present embodiment, the resonating operation is affected by the capacitors C21 to C23 at the mountain and valley parts of the waveform of the pulsative voltage obtained after rectification of the AC power source AC, which results in that the current of the discharge lamp LP as the load has such a waveform as shown in FIG. 2b. Further, since the input voltage to the inverter section 1' from the power supply section 3' has the same waveform as the above, the mutually contradictory operations at the valley and mountain parts of the voltage of the AC power source AC results in acquisition of such a lamp current waveform as shown in FIG. 2d and suppression of peak values of the lamp current waveform with its low crest factor. And the input current has a sinusoidal waveform having the same phase as the voltage waveform of the AC power source AC as shown in FIG. 3, thus improving the distortion of the input current.

(Embodiment 14)

Figure 20:
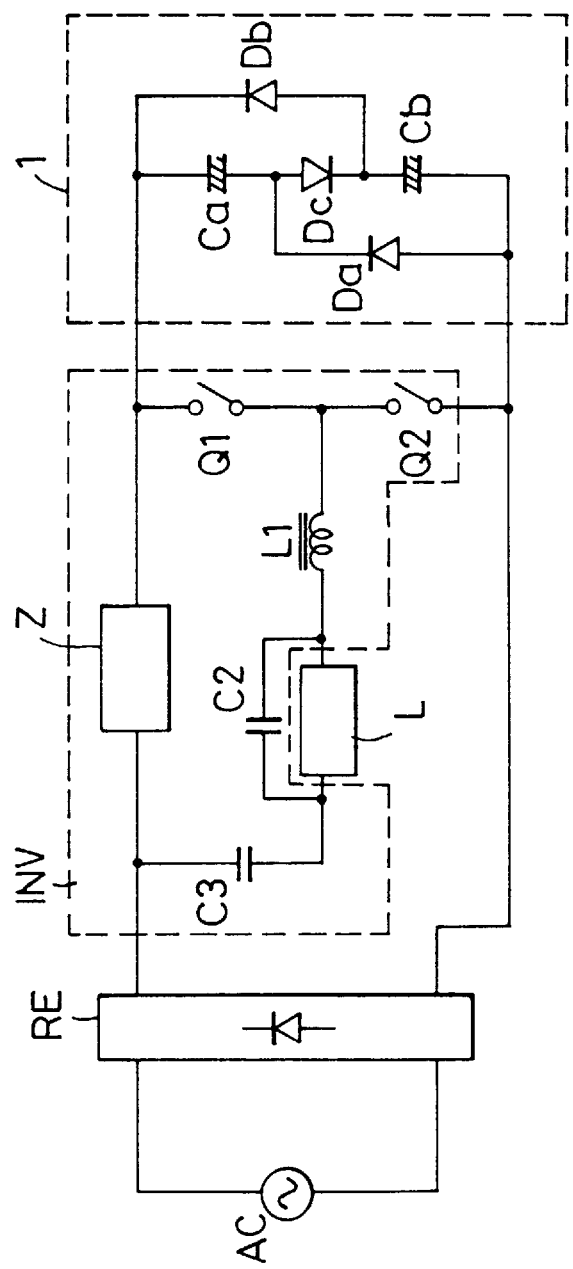

The present embodiment is arranged so that, as shown in FIG. 20, the power voltage of the AC power source AC is full-wave rectified by such a rectification circuit RE as a diode bridge, a DC output voltage of the rectification circuit RE is converted by the inverter circuit INV into a high frequency AC output which is supplied to the load L, and the valley filling circuit 1 is provided at the rear stage of the inverter circuit INV. In other words, the smoothing capacitor in the prior art circuit configuration is replaced by the valley filling circuit 1, and the DC cut-off capacitor C1 and diode D0 are replaced by the suitable impedance element Z (any of capacitor, inductor and resistor or a combination thereof) In more detail, in the inverter circuit INV, a series circuit of the switching elements Q1 and Q2 is connected to one of the DC output terminals of the rectification circuit RE via the impedance element Z, a series circuit of a series resonance circuit of the capacitors C2 and C3 and inductor L1 and the switching element Q2 connected to negative polarity one of the DC output terminals of the rectification circuit RE is connected between the DC output terminals of the rectification circuit RE, and the load L is connected across the capacitor C2. That is, the resonance circuit is connected across the switching element Q1 connected to positive polarity one of the DC output terminals of the rectification circuit RE. Further, the valley filling circuit 1 has a series circuit of a pair of the capacitors Ca and Cb and a diode Dc inserted therebetween, a diode Db connected across a series circuit of the capacitor Ca and diode Dc in inverse parallel thereto, and a diode Da connected across a series circuit of the capacitor Cb and diode Dc in inverse parallel thereto. In the illustrated example, the capacitance of the capacitor Ca is set to be equal to that of the capacitor Cb. The valley filling circuit 1 in turn is connected across the series circuit of the both switching elements Q1 and Q2. Though the switching elements Q1 and Q2 are intended to comprise MOS FETs but also may comprise bipolar transistors or the like having diodes connected inverse parallel thereto.

The both switching elements Q1 and Q2 are alternately turned ON and OFF at a high frequency by a suitable control circuit (not shown). Accordingly, when the switching element Q2 is in its ON state, a resonance current flows from the rectification circuit RE and valley filling circuit 1 through the capacitor C3, load Z. capacitor C2, inductor L1 and switching element Q2; whereas, when the switching element Q1 is in its ON state, the charge of the capacitor C3 is discharged so that a resonance current flows through the switching element Q1, inductor L1, load Z and capacitor C2, and capacitor C3.

When a voltage across the valley filling circuit 1 is substantially constant, a current supplied from the inverter circuit INV to the load L varies in such a manner that the current becomes large at valley parts of the DC output voltage of the rectification circuit RE and small at mountain parts thereof as shown in FIG. 2b, as when the voltage of the AC power source AC has such a waveform as shown in FIG. 2a. The voltage across the valley filling circuit 1 also becomes high at the mountain parts of the DC output of the rectification circuit RE and low at the valley parts thereof, so that, only the valley filling circuit 1 is used for the power supply of the inverter circuit INV, the current supplied from the inverter circuit INV to the load L varies large at the mountain parts of the DC output voltage of the rectification circuit RE and small at the valley parts thereof as shown in FIG. 2c. With such a circuit configuration as shown in FIG. 20, thus, the current supplied from the inverter circuit INV to the load L has such a waveform corresponding to a combination of the current waveforms of FIGS. 2b and 2c as shown in FIG. 2d. That is, the use of the valley filling circuit 1 enables pulling up of peak values of the current waveform of FIG. 2b, with the result that the supply current from the inverter circuit INV to the load L has peak values at the mountain and valley parts of the DC output voltage of the rectification circuit RE, that is, the supply current of the present embodiment less vary when compared with that in the prior art arrangement. Further, the input current has no pause period therein because the charging current flows through the capacitors Ca and Cb of the valley filling circuit 1 at the mountain parts of the DC output voltage of the rectification circuit RE and power is supplied to the inverter circuit INV not only from the valley filling circuit 1 but also from the rectification circuit RE at the valley parts thereof, which results in that the distortion of the input current can be improved. In addition, the input voltage waveform shown by a solid line in FIG. 3 becomes similar to the input current waveform shown by a chain-dotted line, whereby the input power factor can also be improved.

Figure 21:
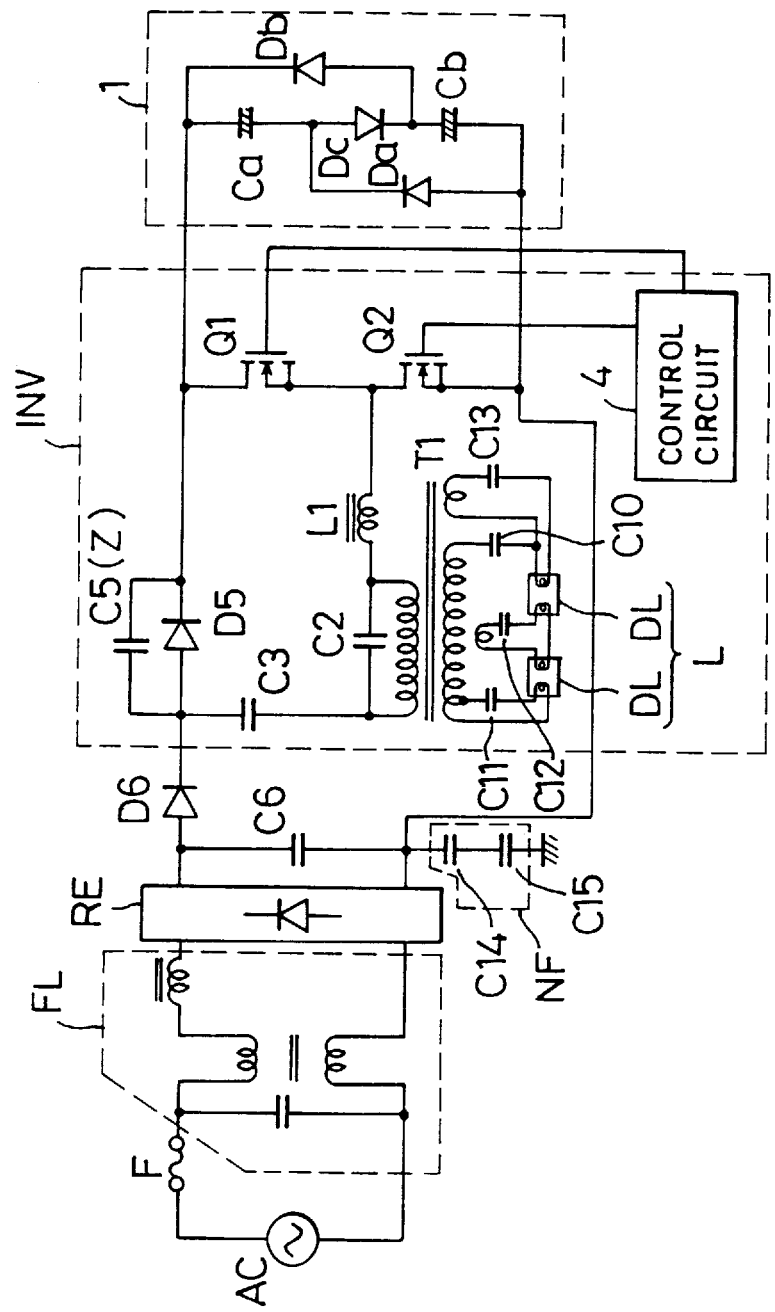
FIG. 21 is a specific circuit diagram of the embodiment of FIG. 20.

Shown in FIG. 21 is an example where 2 discharge lamps DL are used as the load L, as a detailed circuit of the present embodiment. In the circuit of FIG. 21, the primary winding of the output transformer T1 is connected across the capacitor C2, and a series circuit of the 2 discharge lamps DL is connected across the secondary winding of the output transformer T1 via the DC cut-off capacitor C10. Preheating windings provided to the output transformer T1 are connected to filaments of the respective discharge lamps DL through the capacitors C11 to C13 for prevention of filament short-circuiting. The switching elements Q1 and Q2, which comprises MOS FETs, are alternately turned ON and OFF at a constant frequency by the control circuit 4. The capacitor C5 is used as the impedance element Z and the diode D5 is wired across the capacitor C5. The capacitor C6 is connected between the DC output terminals of the rectification circuit RE, and a series circuit of the capacitors C14 and C15 grounded at its one end is connected as the noise preventing filter NF to negative polarity one of the DC output terminals of the rectification circuit RE. Inserted between the AC power source AC and the rectification circuit RE via fuse F is a filter circuit FL so that the noise preventing filter NF and filter circuit FL cause high frequency noise to be prevented from being passed to the AC power source AC. Further inserted between positive polarity one of the DC output terminals of the rectification circuit RE and the capacitor C5 is a diode D6 for prevention of reverse current. Other arrangement and operation are substantially the same as those of the circuit configuration of FIG. 19.

The valley filling circuit 1 used in each of the foregoing embodiments has been arranged so that, when the voltage applied to the valley filling circuit 1 reaches ½ of peak value of the charging voltage, the discharging is started.

Figure 24:
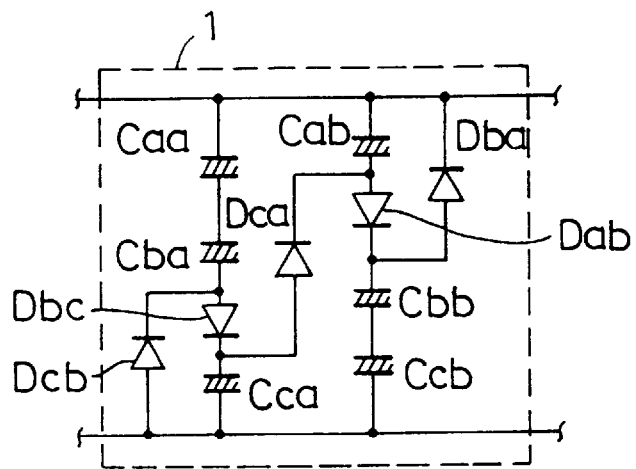
FIGS. 24 and 25 are other modifications of the valley filling circuit appliable in the power supply devices of the present invention.
Figure 25:
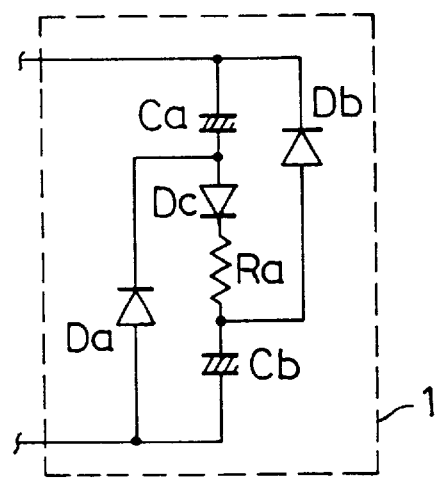

However, when 6 capacitors Caa, Cba, Cca, Cab, Cbb and Ccb and 5 diodes Dab, Dba, Dac, Dca and Dcb are used as shown in FIG. 24, the discharging start voltage ratio to the peak voltage at the time of charging the valley filling circuit 1 can be made to be ⅔. Our experiments have showed that the use of such a valley filling circuit 1 provides the smallest variation width of the current to the load L. Furthermore, in the valley filling circuit 1 of each of the foregoing embodiments, there is a possibility that, since the capacitors Ca, Cb and Cc of the valley filling circuit 1 are rapidly charged by the rectification circuit RE at the time of turning ON the power, a power-on current flows. In this case, however, when a resistor Ra is inserted in a charging path to the capacitors Ca, Cb and Cc as shown in FIG. 25, the charging current can be restricted and the power-on current can be suppressed.

(Embodiment 15)

Figure 22:
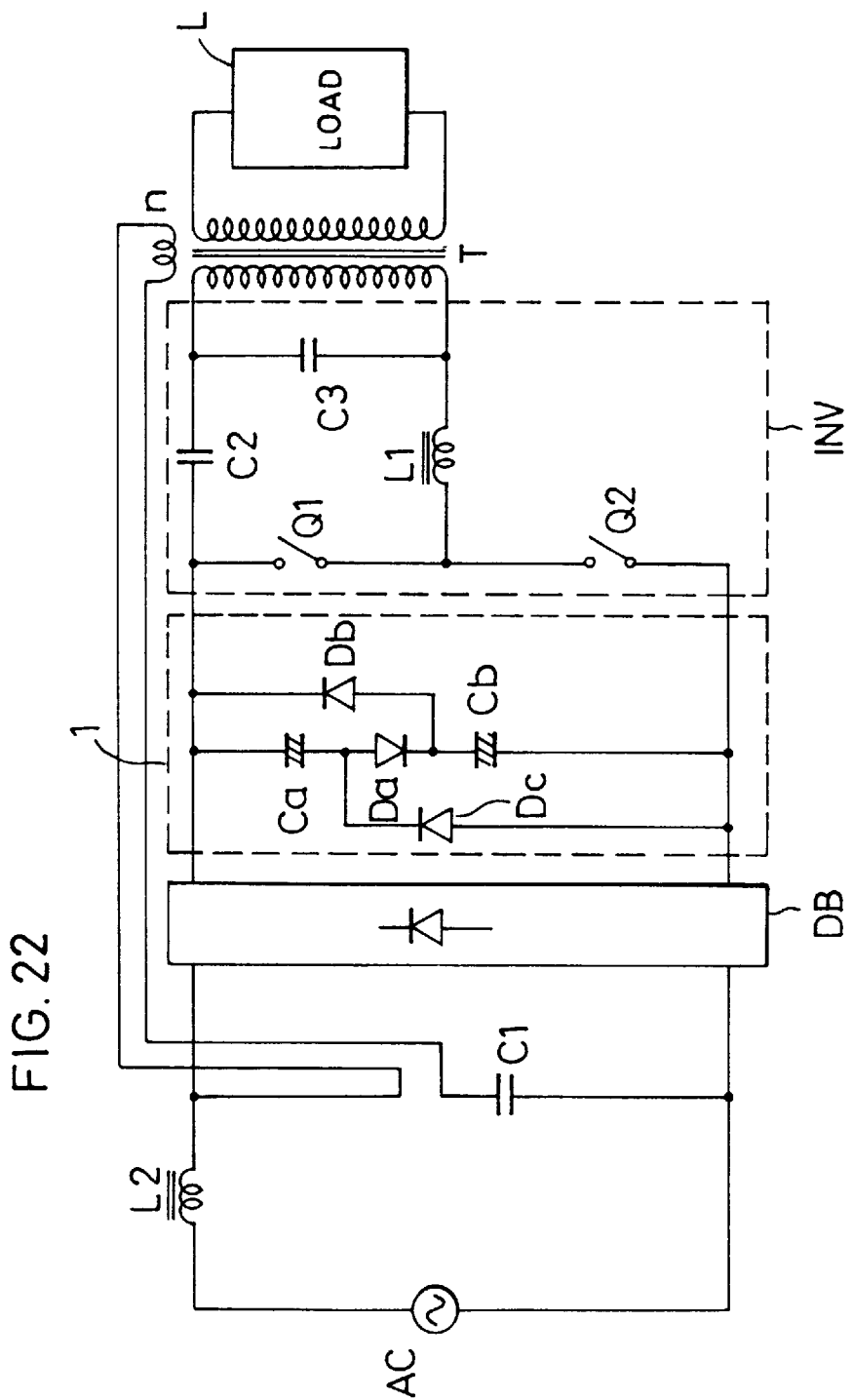
FIGS. 22 and 23 are schematic circuit diagrams of power supply devices in accordance with fifteenth and sixteenth embodiments of the present invention.

FIG. 22 shows a schematic block diagram of a fifteenth embodiment of the present invention. As shown in FIG. 22, in a power supply device of the present embodiment, the diode bridge DB is connected across the AC power source AC via the inductor L2 as a high frequency cut-off filter so that the voltage of the AC power source AC is subjected by the inductor L2 to a high-frequency component removing operation and then subjected by the diode bridge DB to a full-wave rectifying operation to obtain a pulsative DC voltage, the DC voltage is supplied to the inverter circuit INV through the valley filling circuit 1 explained in the circuit arrangement of FIG. 20, a high frequency AC output voltage of the inverter circuit INV is supplied to the load L and also supplied as a feedback to the input of the diode bridge DB through the feedback winding n magnetically coupled with the inductor L1 via the capacitor C1 as a low frequency removing or cut-off filter.

The valley filling circuit 1 has the same configuration as the circuit in FIG. 20. That is, the valley filling circuit 1 comprises the capacitor Ca connected at its one end to positive polarity one of the output ends of the diode bridge DB, the capacitor Cb connected at its one end to negative polarity one of the output ends of the diode bridge DB, the diode Da connected at its anode to the other end of the capacitor Ca and connected at its cathode to the other end of the capacitor Cb, the diode Db connected at its anode to the cathode of the diode Da and connected at its cathode to the positive polarity one of the output ends of the diode bridge DB, and the diode Dc connected at its cathode to the anode of the diode Da and connected at its anode to the negative polarity end of the diode bridge DB.

The inverter circuit INV may be arbitrarily arranged. For example, the circuit INV comprises a resonance circuit of the inductor L1, a capacitor (not shown), etc. and the switching element Q1 connected across the resonance circuit; and is turned ON and OFF under control of a control means (not shown) to generate a high frequency voltage and supply it to the load.

In the present embodiment, the feedback winding n for feedback of a high frequency voltage induced in the inductor L1 is connected to the input ends of the diode bridge DB through the capacitor C1. As a result, since the high frequency voltage is superimposed on the AC voltage of the AC power source AC and tnen supplied to the diode bridge DB, the input current can be made to flow throughout the nearly full one period of the AC voltage of the AC power source AC and thus the distortion of the input current from the AC power source AC can be improved.

Thus, in substantially the same manner as mentioned above in connection with FIG. 2, the AC power source AC outputs the AC voltage having such a sinusoidal waveform as shown in FIG. 2a, and the high frequency output voltage of the inverter circuit INV is fed back to the input of the diode bridge DB via the feedback winding n and capacitor C1 to be superimposed on the AC voltage thereof. The diode bridge DB full-wave rectifies the AC voltage superimposed with the high frequency voltage into a pulsative voltage and supplies the pulsative voltage to the valley filling circuit 1.

In the valley filling circuit 1, since the diode Da is conducted and the diodes Db and Dc are not conducted at mountain parts of the pulsative voltage of the diode bridge DB, the capacitors Ca and Cb are charged through the diode Da. When the pulsative voltage drops to a level lower than the voltage across the capacitor Cb, the diode Db is conducted so that the charge of the capacitor Cb is discharged through the diode Db at valley parts of the pulsative voltage of the diode bridge DB to supply power to the inverter circuit INV. As a result there can be obtained such a load current waveform with its valley parts filled through the discharging of the capacitor Ca as shown in FIG. 2c.

The load current supplied from the inverter circuit INV to the load has such a waveform as shown in FIG. 2b. In this case, since the capacitor C1 connected to the feedback winding n is already fully charged at the mountain parts of the AC voltage shown in FIG. 2a, this will not affect the resonating operation of the inverter circuit INV; whereas, since the charge accumulated in the capacitor C1 is discharged and a voltage across the capacitor C1 drops at the valley parts of the AC voltage, this will affect the resonating operation of the inverter circuit INV via the feedback winding n.

In the present embodiment, the above valley-filling power supply circuit 1 in place of the capacitor C0 is connected between the diode bridge DB and the inverter circuit INV, so that a current having such a waveform as shown in FIG. 2c flows through the inverter circuit INV. In this case, the valley-filling power supply circuit 1 acts to supply the pulsative voltage with its valley parts filled to the inverter circuit INV, while the inverter circuit INV acts to cause the load current to become maximum at its parts corresponding to the valley parts of the pulsative voltage under the influences of the capacitor C1 as mentioned above. Thus, the two mutually contradictory operations enable reduction of peak values of the load current at its valley parts and also enables supply of the substantially constant load current having peak values at the valley and mountain parts (also refer to FIG. 2d).

With such an arrangement as mentioned above, the load current supplied from the inverter circuit INV to the load L can have peak values at both of the valley and mountain parts of the pulsative voltage obtained after full-wave rectification of the AC voltage of the AC power source AC through the diode bridge DB, the peak values of the load current can be controlled to improve the distortion of the input current, the fluctuations (ripples) of the load current can be reduced, and this can be realized with a simple circuit configuration. In the case where a discharge lamp is used as the load L, when such a load current as mentioned above is supplied to the discharge lamp, the interval between peak values of the load current (lamp current) can be made narrow and thus the flickering of the discharge lamp can be made advantageously not to be noticeable.

(Embodiment 16)

Figure 23:
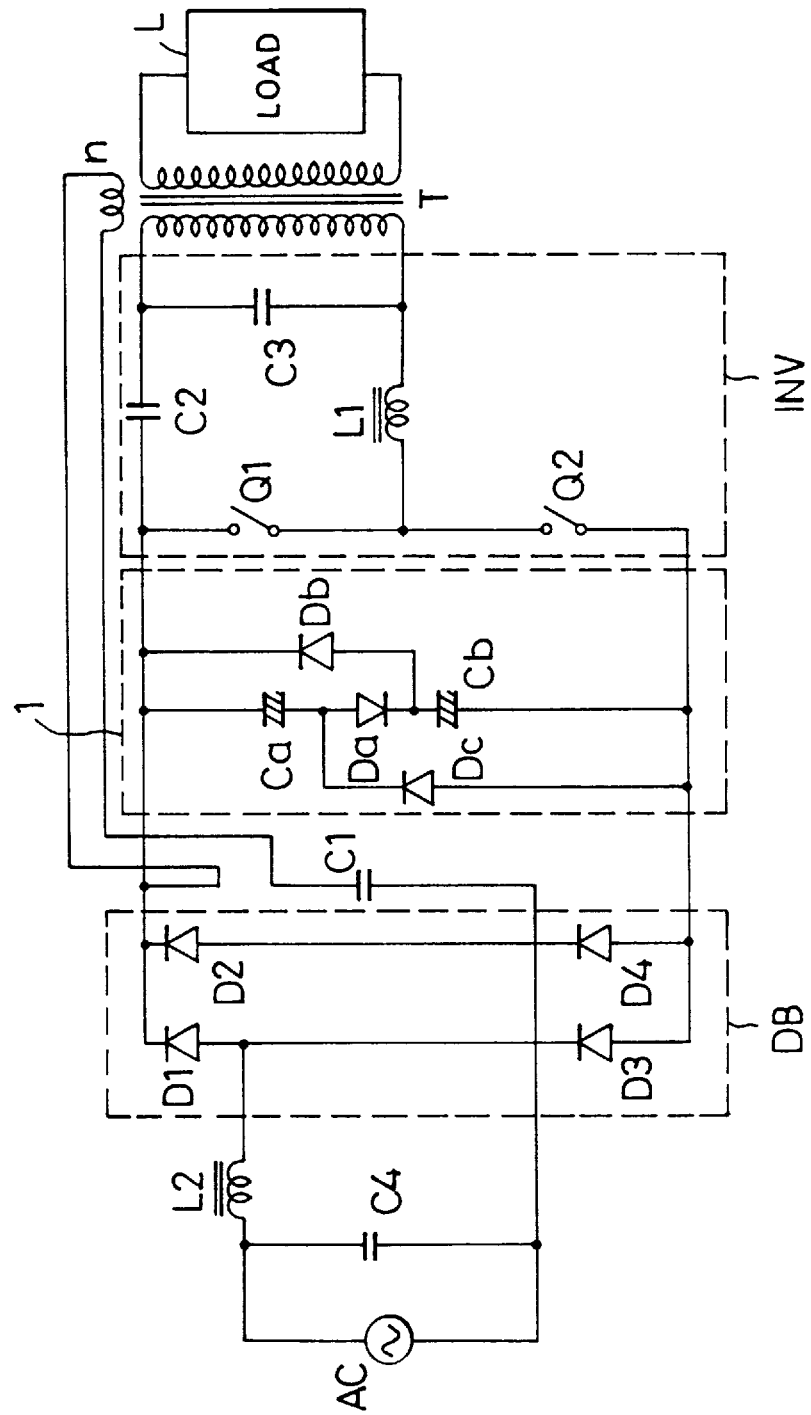

Shown in FIG. 23 is a power supply device in accordance with a sixteenth embodiment of the present invention, in which the diode D2 forming part of the diode bridge DB is turned ON and OFF by a high frequency voltage fed back from the feedback winding n so that the input current to the inverter circuit INV flows in a high frequency manner to thereby improve the distortion of the input current. Further, the degree of contribution of a series filter circuit of the inductor L2 and capacitor C1 connected in series with the feedback winding n with respect to the inverter circuit INV via the transformer T is different between the mountain and valley parts of the pulsative output voltage of the diode bridge DB. That is, since the resonating operation of the inverter circuit INV is less affected by the series circuit of the inductor L2 and capacitor C1 at the mountain parts of the pulsative voltage while is much affected by the series circuit at the valley parts thereof, the load current has such a waveform as shown in FIG. 2b. In the present embodiment, however, the provision of the valley-filling power supply circuit 1 between the diode bridge DB and inverter circuit INV causes the load current to have such a waveform as shown in FIG. 2c as in the above embodiment 15, so that these two mutually contradictory circuit operations enable the power supply device of the present embodiment to supply a load current having such a waveform as shown in FIG. 2d.

Although the present invention has been described in connection with the preferred embodiments thereof, it will be appreciated by those skilled in the art that addition, modifications, substitutions and deletions not specifically described may be made without departing from the spirit and scope of the invention as defined in the appended claims.

What is claimed is:

1. A power supply device comprising:
   rectifying means for rectifying AC power and providing a pulsating DC output voltage;
   inverter means connected to said rectifying means for converting the pulsating DC output voltage to a high frequency output voltage and supplying the high frequency output voltage to a load, said inverter means including first and second switching elements connected in a first series circuit, one of said first and second switching elements being ON when the other of said first and second switching elements is OFF, an impedance element connected between said rectifying means and said first series circuit, and a resonant circuit including a capacitor and a first inductor for providing a resonant output voltage to the load, said resonant circuit and said impedance element forming a second series circuit connected in parallel with one of said first and second switching elements; and
   valley-filling means for accumulating energy from said inverter means when the pulsating DC output voltage has a relatively high amplitude and for supplying accumulated energy across said first series circuit when the pulsating DC output voltage has a relatively low amplitude, said valley-filling means including:
      a third series circuit comprising a first valley-filling capacitor, a second inductor, and a first diode, said third series circuit being connected across said first series circuit;
      a second diode for rectifying the high frequency output voltage of said inverter, charging said first valley-filling capacitor, and connected between said inverter means and a junction of said second diode and said first valley-filling capacitor; and
      a second valley-filling capacitor connected across said first series circuit.

2. The power supply device as set forth in claim 1, wherein said second diode has an anode connected to a junction of said first and second switching elements, said first and second diodes form a fourth series circuit connected across one of said first and second switching elements, and said second diode, said second inductor, and said first valley-filling capacitor form a fifth series circuit connected across the other of said first and second switching elements.

3. The power supply device as set forth in claim 1, wherein said second diode has a cathode connected to a junction of said first and second switching elements;
said second diode, said second inductor, and said first valley-filling capacitor form a fourth series circuit connected across one of said first and second switching elements; and
said first and second diodes form a fifth series circuit connected across the other of said first and second switching elements.

4. The power supply device as set forth in claim 1, wherein said first inductor includes a feedback winding connected to said second diode providing the high frequency output voltage for charging said first valley-filling capacitor.

5. The power supply device as set forth in claim 1, wherein said inverter means includes a third diode connected in parallel with said impedance element.

6. A power supply device comprising:
   a rectifying circuit for rectifying AC power and providing a pulsating DC output voltage;
   an inverter circuit connected to said rectifying circuit for converting the pulsating DC output voltage to a high frequency output voltage and supplying the high frequency output voltage to a load, said inverter circuit including first and second switching elements connected in a first series circuit, one of said first and second switching elements being ON when the other of said first and second switching elements is OFF, an impedance element connected between said rectifying circuit and said first series circuit, and a resonant circuit including a capacitor and an inductor for providing a resonant output voltage to the load, said resonant circuit and said impedance element forming a second series circuit connected in parallel with one of said first and second switching elements;
   a valley-filling circuit connected to output terminals of said inverter circuit and including means for accumulating energy output by said inverter circuit and for discharging accumulated energy to said inverter circuit when the high frequency output voltage applied to said valley-filling circuit falls below a peak of the high frequency output voltage, said valley-filling circuit including a plurality of capacitors and a plurality of diodes respectively connected so that each of the capacitors is series connected to two of said diodes arranged in opposite polarities for discharging each of said capacitors through respective different paths; and
   means connecting said valley-filling circuit across said first series circuit.

7. The power supply device as set forth in claim 6, wherein said plurality of capacitors and said plurality of diodes includes a third series circuit of first and second capacitors and a first diode interposed between said first and second capacitors, a second diode connected across a fourth series circuit formed by said first capacitor and said first diode with the cathode of said first diode connected to the anode of said second diode, and a third diode connected across a fifth series circuit formed by said second capacitor and said first diode, the anode of said first diode being connected to the cathode of said third diode, said first and second capacitors being charged through a path including said first diode and discharged through paths including said second and third diodes.

8. The power supply device as set forth in claim 6, wherein said valley-filling circuit begins discharging energy accumulated in a charged one of said capacitors when the high frequency output voltage falls below two-thirds of a peak voltage to which said capacitor is charged.

9. A power supply device comprising:

a rectifying circuit for rectifying AC power and providing a pulsating DC output voltage;

a valley-filling power supply circuit for increasing an output voltage between peaks of the pulsating DC output voltage:

an inverter circuit for converting an output voltage of said valley-filling power supply circuit into a high frequency output voltage and supplying the high frequency output voltage to a load;

a high frequency feedback circuit for feeding back the high frequency output voltage and superimposing the high frequency output voltage on the pulsating DC output voltage wherein said valley-filling power supply circuit comprises a first capacitor connected at a first terminal to a first output terminal of said rectifying circuit, a second capacitor connected at a first terminal to a second output terminal of said rectifying circuit, a first diode having an anode connected to a second terminal of said first capacitor and a cathode connected to a second terminal of said second capacitor, a second diode having an anode connected to said cathode of said first diode and a cathode connected to said first terminal of said rectifying circuit, and a third diode having a cathode connected to said anode of said first diode and an anode connected to said second terminal of said rectifying circuit.

* * * * *